US008307208B2

(12) United States Patent
Matsuo

(10) Patent No.: US 8,307,208 B2
(45) Date of Patent: Nov. 6, 2012

(54) CONFIDENTIAL COMMUNICATION METHOD

(75) Inventor: Masakatsu Matsuo, Fukuoka (JP)

(73) Assignee: Panasonic Corporation, Osaka (JP)

( * ) Notice: Subject to any disclaimer, the term of this patent is extended or adjusted under 35 U.S.C. 154(b) by 686 days.

(21) Appl. No.: 12/476,373

(22) Filed: Jun. 2, 2009

(65) Prior Publication Data

US 2009/0307495 A1 Dec. 10, 2009

(30) Foreign Application Priority Data

Jun. 4, 2008 (JP) .................................. 2008-146402

(51) Int. Cl.
*H04L 9/00* (2006.01)
*H04L 9/30* (2006.01)
*H04L 9/32* (2006.01)
*H04K 1/00* (2006.01)

(52) U.S. Cl. ........... 713/171; 713/169; 713/170; 380/30

(58) Field of Classification Search .................. None
See application file for complete search history.

(56) References Cited

U.S. PATENT DOCUMENTS

| 4,759,063 | A | 7/1988 | Chaum | |
|---|---|---|---|---|
| 5,241,599 | A * | 8/1993 | Bellovin et al. ............... | 713/171 |
| 6,542,610 | B2 * | 4/2003 | Traw et al. .................... | 380/262 |
| 2004/0006713 | A1 | 1/2004 | Minemura | |
| 2005/0138397 | A1 | 6/2005 | Kusudo et al. | |
| 2005/0138401 | A1 | 6/2005 | Terao et al. | |
| 2006/0015746 | A1 | 1/2006 | Kusudo et al. | |
| 2006/0080732 | A1 | 4/2006 | Ohkubo et al. | |
| 2007/0208939 | A1 | 9/2007 | Iwamoto et al. | |
| 2007/0261108 | A1 | 11/2007 | Lee et al. | |
| 2008/0178263 | A1 | 7/2008 | Tanaka | |
| 2009/0094690 | A1 | 4/2009 | Hayashi | |

FOREIGN PATENT DOCUMENTS

| JP | 2004-317764 | 11/2004 |
|---|---|---|
| JP | 2007-29378 | 2/2007 |
| WO | 2005-031579 | 4/2005 |

OTHER PUBLICATIONS

English language Abstract of JP 2007-29378, Feb. 8, 2007.
English language Abstract of JP 2004-317764, Nov. 11, 2004.
U.S. Appl. No. 12/424,809 to Matsuo, which was filed on Apr. 16, 2009.
U.S. Appl. No. 12/464,436 to Matsuo, which was filed on May 12, 2009.
U.S. Appl. No. 12/425,677 to Matsuo, which was filed on Apr. 17, 2009.
U.S. Appl. No. 12/427,979 to Matsuo, which was filed on Apr. 22, 2009.
S. Bellovin et al., "Encrypted key exchange: Password-based protocols secure against dictionary attacks", In Proc. IEEE Computer Society Symposium on Research in Security and Privacy, 72-84, 1992.

* cited by examiner

*Primary Examiner* — Philip Chea
*Assistant Examiner* — Trong Nguyen
(74) *Attorney, Agent, or Firm* — Greenblum & Bernstein, P.L.C.

(57) ABSTRACT

In SSL encryption communication in which a client and a server share a password, the client generates random number data, encrypts the random number data with a public key and a password, and transmits the encrypted random number data to the server, so that the client and the server safely share the random number data having a bit length longer than that of the password. Safe cryptographic communication is performed without intermediaries by using the random number data or by mutually presenting a hash value of the random number data.

12 Claims, 23 Drawing Sheets

CONFIDENTIAL COMMUNICATION METHOD

CROSS-REFERENCE TO RELATED APPLICATIONS

The present application claims priority under 35 U.S.C. §119 of Japanese Application No. 2008-146402 filed on Jun. 4, 2008, the disclosure of which is expressly incorporated by reference herein in its entirety.

BACKGROUND OF THE INVENTION

1. Field of the Invention

The present invention relates to a confidential communication method that enables safe communication between two points.

2. Description of Related Art

Recently, intermediary attacks, such as phishing, in communication via the Internet are increasingly emerging as threats. Cryptographic communication alone is not sufficient to ensure safety, and therefore effective countermeasures to the intermediary attacks are in demand.

Examples of techniques that ensure safe communication include SSL encryption communication. The SSL encryption communication using an RSA is designed to reduce intermediary attacks. In the SSL encryption communication using the RSA, a server certificate is inspected to verify authenticity of a communication destination.

However, a server certificate is basically inspected visually, and therefore the inspection takes time and effort. In addition, it is difficult to determine whether the server certificate is a fake prepared by an attacker. In order to resolve these problems, HTTP browsers automatically display a warning message when validity of a server certificate is questioned. However, this technique only verifies whether a server certificate has been authenticated by a pre-registered authentication authority, whether there is any problem with the format of a server certificate, such as valid period, a digital signature, and the like. Therefore, this technique would be of no use when an attacker has an authentic server certificate or registers a fake server certificate as an authentic server certificate using a virus and the like.

In order to reinforce the automatic inspection, an EV certificate (a reinforced server certificate) has recently been introduced. However, the EV certificate merely makes attacks slightly more difficult, and does not provide substantial prevention. As described above, there is so far no truly effective prevention of intermediary attacks in cryptographic communication between two points.

A theme herein is prevention of intermediary attacks at least in communication where two points share confidential information, such as a password. Even when the preventive effect is limited to such circumstances, the achievement has great significance.

For example, in Internet communication in which a password is used to identify a user, such as online banking and network camera viewing, users have a certain right to enforce the use of the resources, and therefore such Internet communication is appealing to attackers. In other words, information found in communication involving an indefinite number of communicators is unworthy for attackers to initiate attacks, since the value of such information is low. Therefore, in terms of the degree of damage, the prevention of attacks at least in communication between two points sharing a password has great significance.

When two points confidentially share a password having a cryptographically-safe bit length, safe cryptographic communication can be performed by using the password as a common key. However, it is difficult for general users to memorize such a password.

Therefore, a technique that prevents intermediary attacks with a memorizable password (i.e., confidential information not having a cryptographically-safe bit length) is in demand. Related Art 1 discloses such a technique known as PAKE (Password Authenticated Key-Establishment) (refer to Related Art 1).

[Related Art 1] S. Bellovin and M. Merritt. Encrypted key exchange: Password-based protocols secure against dictionary attacks. In Proc. IEEE Computer Society Symposium on Research in Security and Privacy, 72-84. 1992.

Hereinafter, examples of the use of two types of encryptions in combination is explained with reference to FIGS. 16 and 17. It is also explained that the use of one of the two types of encryptions alone is not sufficient. In FIG. 16, authenticity of a server is not verified.

Specifically, server authentication is not performed, and client authentication alone is performed. In the client authentication, a password is protected by a direct encryption with a public key. FIG. 16 is a process flowchart of an off-line attack initiated by an intermediary existing between an authentic client and the authentic server. Password M shared between the client and the server in advance is unknown to the intermediary. In FIG. 16, the authentic server generates public key E, public key N, and private key D in advance, which is not shown in the drawing. The authentic server delivers public key E (in reality, public keys E and N, and a description of public key N is omitted hereinafter unless otherwise required) to the authentic client through an SSL negotiation. Private key D (in reality, private key D and public key N, and a description of public key N is also omitted hereinafter unless otherwise required) is kept by the authentic server. The client (1) directly encrypts password M with public key E, and (2) transmits obtained value X (in reality, "$M^E$ mod N", and, as shown in the drawing as "$M^E$", a description of "mod N" is omitted hereinafter) to the server. The server has private key D with which data encrypted with public key E can be decrypted, so that the server can derive password M by decrypting value X received from the client. Although password M is unknown to the intermediary, the intermediary can intercept and obtain public key E and value X (encrypted password M). After intercepting and obtaining public key E and value X, the intermediary initiates a brute force attack to derive the password that matches value X received from the client, by (4) generating all types of possible passwords M1, M2, ... (in reality, all numbers 1, 2, ... are sequentially checked as value M) and by encrypting them with public key E. In other words, the intermediary initiates a brute force attack off-line (an off-line attack). Password M is normally composed of combinations of 6-10 characters including alphanumeric characters, a few symbols such as "@#%", and the like. One character is selected from approximately 60 alphanumeric characters and a number of symbols, and the information amount of one character is approximately 6 bits. Accordingly, the information amount of password M is theoretically approximately from 36 bits (equivalent to six characters) to 60 bits (equivalent to 10 characters). However, in reality, many users use memorizable passwords, which are vulnerable to dictionary attacks, and the number of character combinations of a password is much less than the theoretical number. In any case, a bit number of the password level does not prevent the brute force attacks described above, and therefore it is not difficult to identify password M. When value X is encrypted with a common key generated through the SSL negotiation between the authentic client and the authentic server before the transmission and reception of value X, the intermediary cannot decrypt encrypted value X, and hence the above-described off-line attacks are prevented. However, when the intermediary, in addition to intercepting data, performs an SSL negotiation with the client by masquerading as the authentic server, or performs an SSL negotiation with the server by masquerading as the authentic client, and then initiates a bucket brigade attack on-line (an on-line attack), the intermediary can decrypt all the encrypted data transmitted and received between the client and the server. Therefore, password M can be easily identified. Unless verifying authenticity of the server (i.e., correctly performing the server authentication) before the client authentication, communication can be easily intercepted by the intermediary with an online attack. Accordingly, the server authentication must be performed before the client authentication. However, encrypting a password with a public key does not allow the server authentication to be performed before the client authentication. As described above, the direct encryption of a password with a public key does not ensure a high level of safety. In FIG. 17, unlike the example in FIG. 16, the server authentication is performed before the client authentication. In the server authentication in FIG. 17, the client generates a random number, and transmits data generated by encrypting the random number with a password to the server. The server then presents the random number to the client. In other words, the password is used as a common key between the client and the server. Similar to FIG. 16, FIG. 17 is a process flowchart indicating when an off-line attack is initiated by an intermediary existing between the client and the server. Similar to the example in FIG. 16, only the client and the server share password M in advance, and password M is unknown to the intermediary. In FIG. 17, the server and the client start an SSL negotiation, and generate common key K. For example, 3DES (hereinafter, referred to as DES as shown in the drawings) is used as a common key cipher. The number of bits thereof is much larger than that of the password so that brute force attacks are prevented. For example, public key N is 1024 bits, and the DES is 168 bits. However, the further computer technology advances, the longer a bit length a brute force attack can crack. Therefore, a bit length has to be determined in response to the present times. The same applies hereinafter. The client (1) randomly generates random number R having a bit length long enough to prevent brute force attacks, such as 1024 bits, and (2) encrypts random number R with password M. (Although random number R is encrypted with password M by multiplication in the drawing, the present invention is not limited to the same. Any common key cryptosystem, such as the DES or AES, may be used. Password M may be used as the common key, or the common key may be newly generated based on the password. The same applies hereinafter.) The client then (3) transmits value Z (encrypted random number R) to the server. Since the server has password M, (4) the server can derive random number R through decryption. Subsequently, the server (5) hashes random number R, and (6) transmits hash value A=Hash (R) to the client. (7) In receiving hash value A from the server, (8) the client generates value B by hashing previously self-generated random number R. The client then (9) verifies whether value B matches hash value A received from the server, and determines whether the server is authentic (server authentication). In reality, both hash value A and hash value B are Hash (R), and therefore these values match. The client (11) transmits to the server value DES (K, R) (10) generated by encrypting previously self-generated random number R with common key K. (When the party in communication with the client is verified to be the authentic server in server authentication, the party in the SSL negotiation with the client is verified to be the authentic server. Therefore, encrypting the data with the common key generated in the SSL negotiation prevents third parties, such as an intermediary and the like, from opening the data transmitted and received between the client and the server. The same applies hereinafter.) The server sharing common key K with the client (12) derives random number R by decrypting value DES (K, R) with common key K. (13) When random number R matches the value derived by decrypting value Z with password M, the client's authenticity is verified. (Client authentication. Herein, the client presents the previously used random number to the server for the client authentication. However, since the server authentication has been finished at this point, the client may encrypt the password, and presents the encrypted password for the client authentication instead of presenting the random number. The same applies hereinafter.) The server notifies the client of completion of the authentication, by which the server and the client start regular SSL encryption communication. The notification of authentication completion is not necessarily required. The intermediary without password M can intercept and obtain value Z generated by encrypting random number R with password M, hash value A, and value DES (K, R). However, the random number transmitted and received between the client and the server is hashed and encrypted, and therefore the password cannot be easily identified through back-calculation. The intermediary then (16) generates all types of possible passwords M1, M2, (in reality, all numbers 1, 2, are sequentially checked as value M); derives R1, R2, . . . through back-calculation of value Z with the possible passwords; generates hash values thereof; and verifies whether any of them matches hash value A by a brute force attack. In other words, the intermediary initiates a brute force attack off-line (an off-line attack). As described above with reference to FIG. 16, password M is only approximately 36-60 bits, which does not prevent brute force attacks. Therefore, it is possible to identify password M. The above-described off-line attacks can be prevented by encrypting both value Z and value A with the common key generated in the SSL negotiation between the authentic client and the authentic server. However, when the intermediary existing between the authentic client and the authentic server, in addition to just intercepting data, performs an SSL negotiation with the client by masquerading as the authentic server, or performs an SSL negotiation with the server by masquerading as the authentic client, and then initiates a bucket brigade attack, the intermediary can decrypt all the encrypted data transmitted and received between the client and the server. Thereby, the intermediary can obtain value Z that is not encrypted and value A. In this case, the intermediary can pass through both the client authentication and the server authentication only by the bucket brigade attack without identifying the password. In other words, on-line attacks are possible in this case. Accordingly, the server authentication is not effective in the above-described authentication method. As described above, the client's encrypting the self-generated random number with the password does not ensure a high level of safety.

The conventional technique requires both the server and the client to perform heavy calculation. Further, in SSL encryption communication, the conventional technique requires another cryptographic processing in addition to the RSA performed herein. For this reason, a server load increases, and therefore requires a larger memory. Furthermore, the conventional technique requires an increased number of negotiation steps between the server and the client, and therefore the negotiation is prolonged.

When the client's CPU processing function is of lesser quality, or the server performs SSL encryption communication with a large number of clients, both the client and the server have a performance drop problem.

The SSL encryption communication using the RSA (asymmetric public key cryptosystem) is most frequently used by general users, has been practically implemented, and has widely spread. Therefore, there is a need for intermediary attack prevention using a password that is suitable to the SSL encryption communication using the RSA and that ensures safety.

SUMMARY OF THE INVENTION

The present invention addresses the above-described problems of the conventional technique. A primary advantage of the present invention is to provide a confidential communication method that reduces risks of intermediary attacks by using a password in an asymmetric public key cryptosystem, such as an RSA.

In order to resolve the above-described problems, a first aspect of the present invention provides a confidential communication method in an asymmetric public key cipher system where a client and a server share a password, wherein the client has a public key cipher system encrypter performing encryption with a public key in the public key cipher system, a password encrypter performing encryption with the password, and one of a random number data generator generating random number data, and a random number data generator obtaining the random number data from another apparatus; and the server has a public key cipher system decrypter decrypting data encrypted by the public key cipher system encrypter and a password decrypter decrypting data encrypted by the password encrypter. The client generates the random number data using the random number data generator, encrypts the random number data using the public key cipher system encrypter, and further encrypts the random number data, which has been encrypted by the public key cipher system encrypter, using the password encrypter. The server decrypts the random number data, which has been encrypted by the public key cipher system encrypter and the password encrypter, using the public key cipher system decrypter and the password decrypter. Both the client and the server have one of a common key encrypter/decrypter performing encryption and decryption with the common key and being equivalent to the password encrypter; and a common key encrypter/decrypter performing encryption and decryption with the common key and being different from the password encrypter. Cryptographic communication is performed between the client and the server by using one of the common key generated from at least a portion of the random number data and the common key generated from at least a portion of the random number data as an original key, in the common key encrypter/decrypter.

According to the above, a configuration of the SSL encryption communication using an RSA (asymmetric public key cipher system) may be used without any modification to create a base that enables safe intermediary-free communication between the authentic client and the authentic server without degrading the performance. This is also very effective in e-mail communication. Unlike an S/MINE, this method easily prevents intermediary attacks by sharing a password in advance, without using a digital certificate.

Even when an attacker masquerades as the authentic server, and communicates with the authentic client, the attacker cannot obtain the random number data that is to be transmitted by the client, even with a private key used in a public key cryptosystem, since the random number data is encrypted with the password. When the random number data is provided with a sufficiently long bit length, even off-line attacks are also almost impossible.

However, when the encryption described in the first aspect of the present invention is performed in a reverse order, such that the random number data is encrypted with the password, and then the encrypted random number data is further encrypted with the public key, an intermediary attack is possible. When an attacker successfully delivers the attacker's public key to the authentic client, the authentic client performs encryption with the received public key and the password. Thereby, the attacker is able to derive the password-encrypted random number data using the attacker's private key. Since the password has a short bit length, the attacker could initiate an off-line attack on the password as a clue.

Even when an attacker intervenes in communication between the authentic client and the authentic server, and the exchanged data is passed through the attacker during authentication, an intermediary attack cannot be established. Since this allows the client to obtain the authentic server's public key, the intermediary is prevented from intercepting the data.

On the contrary, even when an attacker masquerades as the authentic client and communicates with the authentic server, it is very difficult for the attacker to derive the password by back-calculating the data transmitted by the attacker without the private key used in the public key cryptosystem, as it is a discrete logarithm problem. Even off-line attacks are almost impossible.

The server is utilized by a plurality of users, and has each user's password. Although how the server selects an applicable password is not described herein, using an ID is simplest, as it is used in password authentication. However, without using an ID, the server may sequentially read out each password and perform calculation, until the server finds a recognizable command in the cryptographic communication.

The only difference between the public key cipher system encrypter and the public key cipher system decrypter is the key used therein, and the same data processing method may be used. The public key cipher system includes a hybrid cipher in which the common key is encrypted by the public key cryptosystem, and data is encrypted with the encrypted common key.

The password encrypter used herein is a cipher in which a password is used as a key, and the present invention is not limited to this method. A well-known common key cryptographic method, such as DES and AES, or a method in which a password is multiplied by data may be used.

The random number data used herein is not limited to true random data, and various data not assumable by a third party may be used as the random number data. Accordingly, the random number data generator generates such data, and does not have to follow a well-known random number algorism. The random number data is not such that the entire data is randomly constructed. The random number data may include some known data that are randomly aligned or partially constructed in a random manner. Randomness of the random number data is important in terms of ensuring safety. Therefore, in practical use, sufficient randomness must be ensured in the data.

Herein, a party holding a public key alone is referred to as a client, and a party holding a private key is referred to as a server, in the asymmetric public key cipher system. When both parties hold different private keys in the asymmetric public key cipher system, respectively, either party is a client/server.

Herein, various common key cryptosystem may be used as the cryptographic method other than the public key cryptosystem. The common key used herein does not have to be the random number data itself as long as the common key partially involves the random number data in some form. For example, in the SSL encryption communication, a new common key can be generated by multiplying the common key generated in the communication by the random number data of the common key.

Herein, the random number data is used as the common key. Although a new common key can be further exchanged by using the random number data, doing so is not preferable, as it requires much time and effort.

A second aspect of the present invention provides the confidential communication method, wherein the client verifies whether the server has the password before the client provides the server with one of the random number data itself, data different from the random number data encrypted by the public key cipher system encrypter and the password encrypter and giving a clue to the random number data, the password itself, and data giving a clue to the password.

According to the above, the method is preferable as the client can precisely detect likely intermediary attacks. In terms of safety, it is desirable to perform the server authentication before initiating the cryptographic communication using the common key generated from the random number data. However, when the random number data has a sufficiently long bit length, safety is ensured in the cryptographic communication using the common key generated from the random number data without the server authentication by the client. Even when an attacker masquerades as the server, and communicates with the authentic client, although the cryptographic communication is not established, communication information and the password remain concealed from the attacker.

In case that the client needs to present the password or the random number data to the server for system related reasons, as described in the second aspect of the present invention, the client has to authenticate the server at least before the presentation.

After the client verifies whether the server has the password, the client does not have to notify the server of the result. When no problem is found, the client may proceed to access the server.

A third aspect of the present invention provides the confidential communication method, wherein the client prepares authentication data at random, encrypts the authentication data using the common key encrypter/decrypter, and transmits the encrypted authentication data to the server; and the server decrypts the received authentication data using the common key encrypter/decrypter. Both the client and the server have a back-calculation-difficult calculator that makes back-calculation very difficult. The server processes at least a portion of the authentication data using the back-calculation-difficult calculator, and presents the processed authentication data to the client. The client, similar to the server, processes the authentication data using the back-calculation-difficult calculator, and compares the processed authentication data to the processed authentication data received from the server so as to determine whether the server has the password, based on whether both authentication data match.

According to the above, safety is enhanced in the server authentication. The reason for this is that the client encrypts the random number data with the public key. Unlike the first aspect of the present invention, where the random number data is encrypted with the password alone without the public key, an intermediary attack is possible. By applying sequentially changed passwords, the attacker can find the password that matches the authentication data presented by the authentic server.

The authentication data prepared by the client at random herein may be, for example, new random number data.

Herein, the calculation that makes back-calculation difficult is not limited to a one-way function, such as a hash or a square function. For example, the calculation may be performed by extracting a certain bit or by presenting the remainder resulting from calculation in which the random number data is a divisor and the authentication data is a dividend. This calculation also makes back-calculation difficult. As described above, the present invention is not limited to this method as long as attackers are prevented from back-calculating.

In the method according to the third aspect of the present invention, by using the authentication data as a new common key for the encryption, new authentication data may be additionally transmitted and received for authentication. This method may be performed in several steps. However, it is not preferable since calculation and negotiation take time in this method.

A fourth aspect of the present invention provides the confidential communication method, wherein, after the client verifies whether the server has the password, the server verifies whether the client has the password.

According to the above, safety is ensured in communication without the common key described in the first aspect of the present invention since mutual authentication is performed between the client and the server. For example, in the SSL encryption communication, using the common key generated in the communication is sufficient to ensure safety in the communication. Therefore, existing cryptographic communication, such as the SSL encryption communication, does not have to be modified.

A method used for the server authentication by the client may be used for the client authentication by the server in the third aspect of the present invention or a seventh aspect of the present invention that is to be described later. For example, when the server presents a hash value of the random number data, the client may present a second power or a different hash value of the random number data. However, another method may also be used since the server authentication by the client has been finished by the time the server verifies whether the client has the password. For example, the client may be authenticated by encrypting the random number data itself or the password itself in the public key cryptosystem and by transmitting the encrypted random number data or password to the server. However, the random number data itself, not to mention the password, should not be transmitted unencrypted. With the encrypted random number data that has been previously transmitted and the unencrypted random number data, the attacker can easily back-calculate the password.

The client authentication should not be performed before the server authentication. Although an attacker masquerading as the server cannot succeed in the server authentication without the password, the attacker can initiate an off-line attack using the data presented in the client authentication and the encrypted random number data.

The server does not have to notify the client that the client has been verified to have the password. Since the attacker might initiate an online attack using an automated program, it is preferable that the client be not notified of the authentication result. Similarly, even when the authentication has failed, it is preferable that the communication be maintained. In such a case, it is preferable that dummy communication be suitably performed.

A fifth aspect of the present invention provides the confidential communication method, wherein both the client and the server have one of: a second common key encrypter/decrypter performing encryption and decryption with the common key and being equivalent to one of the password encrypter and the common key encrypter/decrypter; and a second common key encrypter/decrypter performing encryption and decryption with the common key and being different from one of the password encrypter and the common key encrypter/decrypter. Cryptographic communication is performed between the client and the server by using one of: the common key generated from at least a portion of exchanged data different from the random number data; and the common key generated from at least a portion of the exchanged data as an original key, in the second common key encrypter/decrypter, the common keys being exchanged by using one of: the public key cipher system encrypter and the public key cipher system decrypter; the password encrypter and the password decrypter; the common key encrypter/decrypter; and the cryptographic communication using the password performed from the server to the client.

According to the above, the configuration of the SSL encryption communication using the RSA (asymmetric public key cipher system) may be used without any modification to create a base that enables safe intermediary-free communication between the authentic client and the authentic server without degrading the performance.

For example, the exchanged data described herein may be new random number data. In the SSL encryption communication, for example, the public key generated in the communication is the exchanged data described herein. Since mutual authentication is performed between the client and the server, the random number data does not have to be used as the common key. For example, using the common key generated in the SSL encryption communication is sufficient to ensure safety in the communication.

The data may be exchanged at any time, regardless of when the server authentication or the client authentication is performed. Similarly, cryptographic communication using the exchanged data as the common key may be performed at any time, regardless of when the server authentication or the client authentication is performed. However, since communication performed before the client authentication may have been intercepted by an intermediary, such communication should be limited to what that may be open to third parties.

A sixth aspect of the present invention provides a confidential communication method in an asymmetric public key cipher system where a client and a server share a password, wherein the client has a public key cipher system encrypter performing encryption with a public key in the public key cipher system, a password encrypter performing encryption with the password, and one of a random number data generator generating random number data, and a random number data generator obtaining the random number data from another apparatus; and the server has a public key cipher system decrypter decrypting data encrypted by the public key cipher system encrypter and a password decrypter decrypting data encrypted by the password encrypter. The client generates the random number data using the random number data generator, encrypts the random number data using the public key cipher system encrypter, and further encrypts the random number data, which has been encrypted by the public key cipher system encrypter, using the password encrypter. The server decrypts the random number data, which has been encrypted by the public key cipher system encrypter and the password encrypter, using the public key cipher system decrypter and the password decrypter. The server confidentially reveals the client that the server has obtained the random number data without informing a third party, so that the client verifies that the server has the password.

According to the above, the configuration of the SSL encryption communication using an RSA (asymmetric public key cipher system) may be used without any modification to create a base that enables safe intermediary-free communication between the authentic client and the authentic server without degrading the performance.

A seventh aspect of the present invention provides the confidential communication method, wherein both the client and the server have a back-calculation-difficult calculator which makes back-calculation very difficult. The server processes one of the random number data and at least a portion of random number data newly exchanged in a method similar to that used to exchange the random number data, using the back-calculation-difficult calculator, and presents the processed random number data to the client. The client, similar to the server, processes the random number data using the back-calculation-difficult calculator, and compares this processed random number data to the processed random number data received from the server so as to determine whether the server has the password, based on whether both random number data match.

According to the above, safety is enhanced in the server authentication. The reason for this is that the client encrypts the random number data with the public key. Unlike the first aspect of the present invention, an intermediary attack is possible when the random number data is encrypted with the password alone without the public key. The attacker can initiate an off-line attack using the password-encrypted random number data transmitted by the authentic client and the data presented by the authentic server.

An intermediary attack also succeeds when, unlike the seventh aspect of the present invention, the server presents the random number data itself to the client. When an attacker successfully delivers the attacker's public key to the authentic client, the authentic client performs encryption with the attacker's public key and the password. Then, the attacker forwards the encrypted data to the authentic server, and decrypts the random number data presented by the server with the server's public key and the attacker's private key, so that the attacker can derive the random number data itself.

Herein, the calculation that makes back-calculation difficult is not limited to a one-way function, such as a hash function or a square function. For example, the calculation may be performed by extracting a certain bit. As long as attackers are prevented from back-calculating, the present invention is not limited to this method.

An eighth aspect of the present invention provides the confidential communication method, wherein both the client and the server have a random number data memory storing the random number data in a memory device and retrieving the stored random number data out of the memory device. Both the client and the server store the random number data in the memory device using the random number data memory after obtaining the random number data, and retrieve the random number data out of the memory device using the random number data memory the next time a connection is made between the client and the server.

According to the above, a safe connection can be made again when communication is resumed. Herein, the random number data may be used as a one-time password.

A ninth aspect of the present invention provides the confidential communication method, wherein, when the client verifies whether the server has the password, the server notifies the client of its communication destination information using the cryptographic communication. The client then verifies whether there is an intermediary between the client and the server, based on the communication destination information of the server in communication with the client and the received communication destination information.

Herein, for example, an IP address may be used as the communication destination information. According to the above, intermediary interventions are completely eliminated, and therefore regular cryptographic communication, such as the SSL encryption communication, is sufficient to ensure safe when the client reconnects to the same communication destination. However, one must note that, when there is a long interval between communication disconnection and reconnection, the server's IP address may have been altered by an attacker.

A tenth aspect of the present invention provides the confidential communication method, wherein, when the server verifies whether the client has the password, the client notifies the server of its communication destination information using the cryptographic communication. The server then verifies whether there is an intermediary between the client and the server, based on communication destination information of the client in communication with the server and the received communication destination information.

According to the above, intermediary interventions are completely eliminated, and therefore regular cryptographic communication, such as the SSL encryption communication, is sufficient to ensure safety when the client reconnects to the same communication destination. However, one must note that, when there is a long interval between a communication disconnection and reconnection, the server's IP address may have been altered by an attacker.

As described above, the confidential communication method according to the present invention eliminates intermediaries, and ensures safety in an asymmetric public key cryptographic communication, such as the SSL encryption communication, in a simple manner and under a light load while using a cryptographically-vulnerable password having a short bit length.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

A concept of the present invention will be explained hereinafter with reference to FIGS. 8 and 9.

Figure 8:
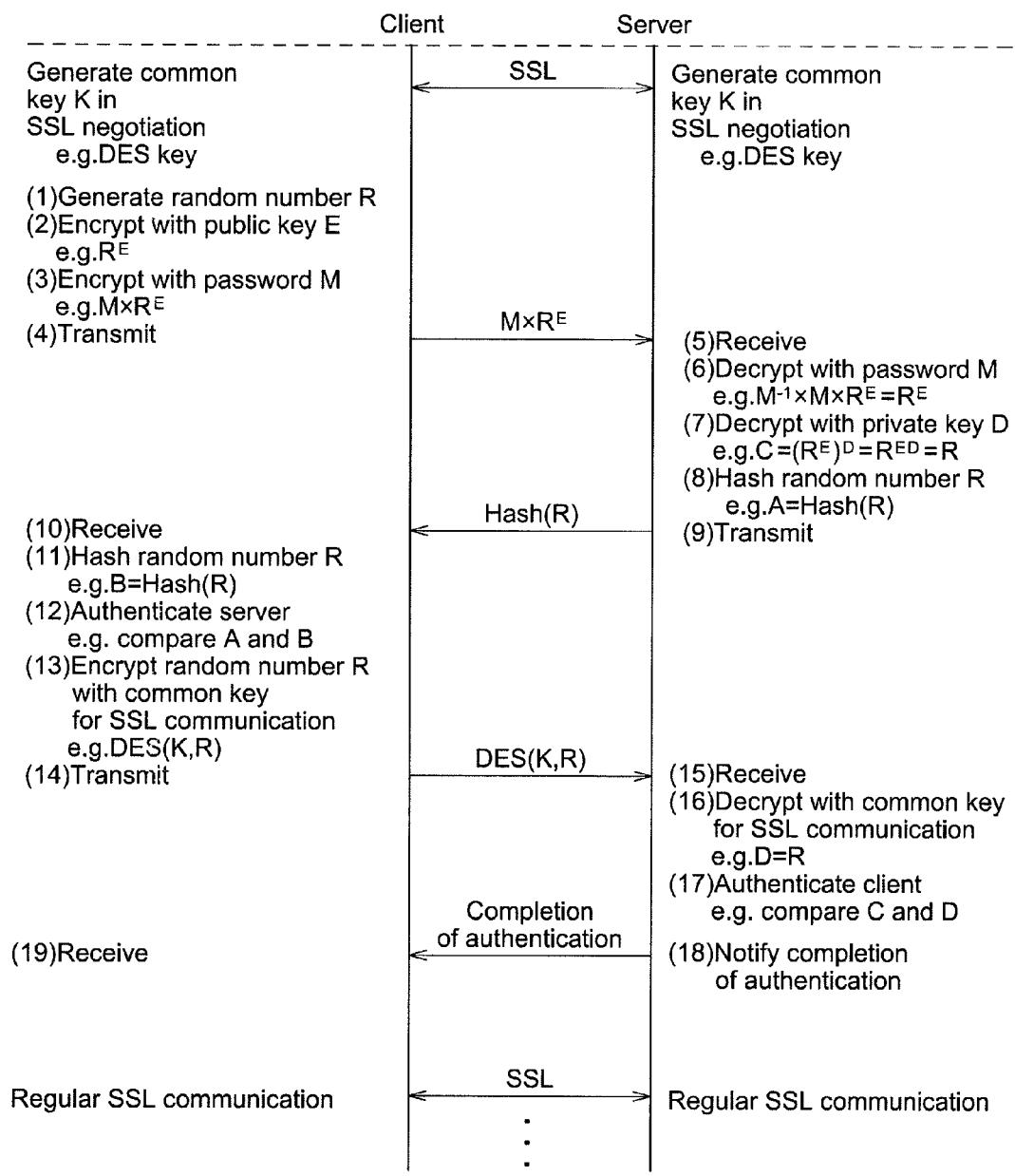
FIG. 8 is a flowchart showing another example of the confidential communication method according to the present invention.

FIG. 8 is a flowchart showing one example of a confidential communication method according to the present invention. It also shows an exemplary method in which a client and a server authenticate each other to eliminate intermediaries, so that cryptographic communication is safely performed only with a common key of SSL encryption communication. However, unlike the example shown in FIG. 6, random number data is not used as the common key.

A regular SSL negotiation is performed between the client and the server. At this point, the client obtains the server's SSL public key. In addition, at this point, a type of common key cipher system used in the SSL encryption communication is determined. Although FIG. 8 describes DES, the present invention is not limited to this common key cipher system.

The client (1) generates the random number data, and (2) encrypts the random number data with the SSL public key. It is preferable that the random number data have a cryptographically-safe bit length so that off-line attacks are prevented. (3) The random number data encrypted with the SSL public key is further encrypted with a password. As long as the password bit length is not extremely short, it is difficult to initiate intermediary attacks, and therefore safety is ensured. However, when the encryption is performed in a different order, intermediary attacks are enabled. Therefore, the encryption has to be performed in a correct order. Then, (4) the random number data encrypted with the password and the SSL public key is transmitted to the server.

Meanwhile, (5) the server receives the random number data encrypted with the password and the SSL public key from the client. (6) First, the server decrypts the random number data, which has been encrypted with the password and the SSL public key, using the password, so that the server obtains the random number data encrypted with the SSL public key. Although how the server identifies the client's password is not described herein, the client may transmit an ID that specifies the password, similar to that in regular password authentication, for example. Alternatively, the password may be stored in relation to the client's communication destination information.

Next, (7) the server decrypts the random number data, which has been encrypted with the SSL public key, using its SSL private key, so that the server derives the random number data. Even when an attacker masquerades as the server at this point, the attacker cannot decrypt the random number data without the password. In addition, since there is no clue except for the encrypted random number data, it is difficult to initiate off-line attacks as well.

The server (8) calculates a hash value of the random number data, and then (9) transmits the hash value to the client.

The client (10) receives the hash value of the random number data, and then (11) performs hash-calculation on the random number data in the same method as that used by the server, so that the client obtains a hash value of the random number data. (12) The client then compares the hash value received from the server to the hash value that the client has obtained through the hash-calculation of the random number data. When the hash values match, it is determined that the server has the password. In other words, the client performs server authentication.

Subsequently, (13) the client encrypts the random number data with the SSL common key, and (14) transmits the random number data encrypted with the SSL common key to the server.

(15) The server receives the random number data encrypted with the SSL common key. The server then (16) decrypts the random number data, which has been encrypted with the SSL common key, using the SSL common key, and (17) compares the decrypted random number data to the previously obtained random number data. When the random number data match, it is determined that the client has the password. In other words, the server performs client authentication. Although a random number is used for the client authentication herein, regular password authentication may be performed as long as the password is encrypted with the SSL common key, such that the client transmits the password encrypted with the SSL common key to the server.

After the authentication, (18) the server notifies the client of completion of the authentication. (19) The client receives the notification. The notification of authentication completion is not necessarily required.

Subsequently, safe cryptographic communication can be performed by using the SSL common key.

Figure 9:
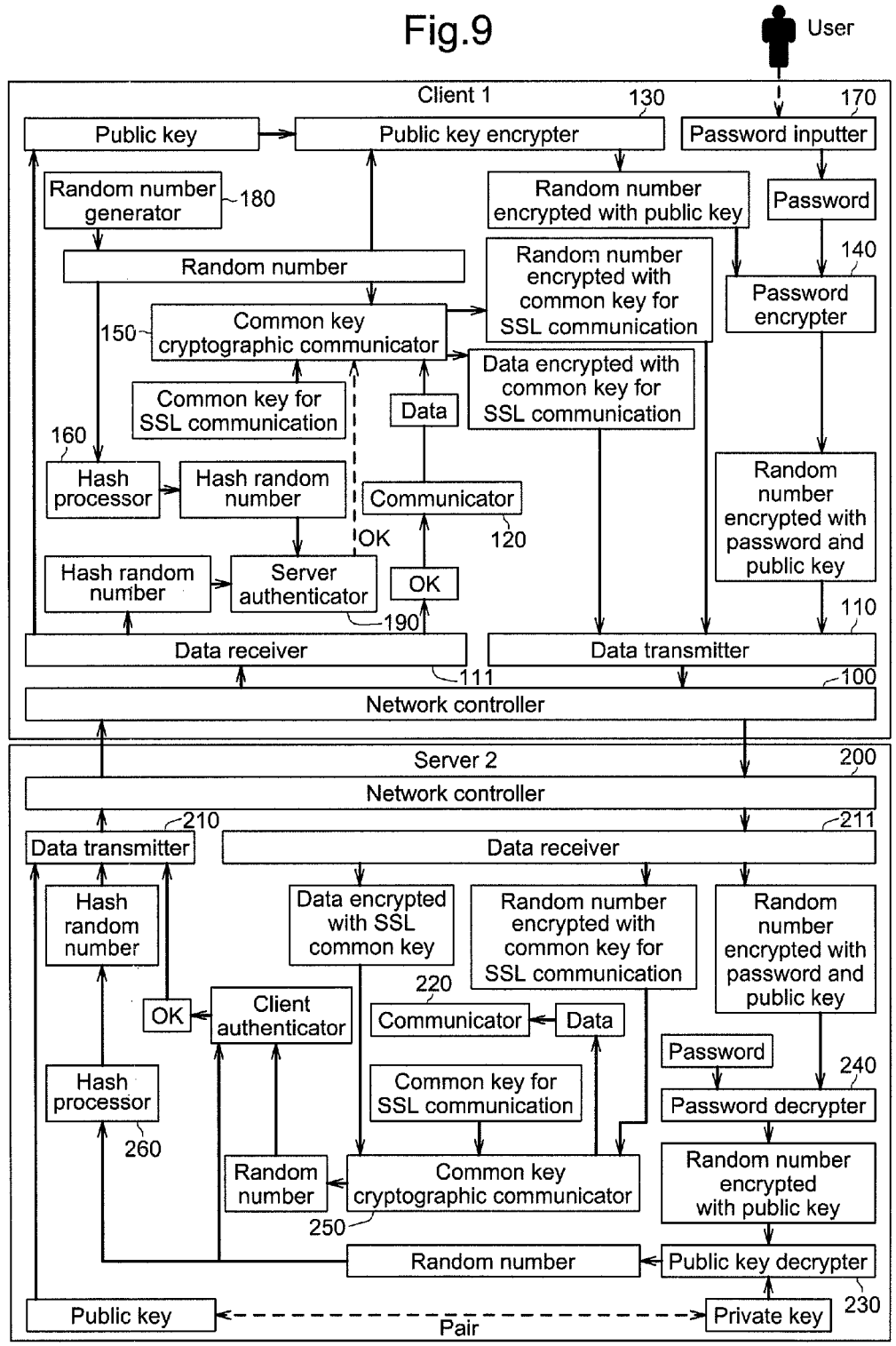
FIG. 9 is a block diagram of FIG. 8.

FIG. 9 is a block diagram of FIG. 8.

First, the client connects to the server, and performs the SSL negotiation. At this point, the client obtains the server's SSL public key. The SSL common key is generated in the SSL negotiation.

A user inputs the password using password inputter 170. In asynchronization with this, random number data generator 180 generates the random number data. Public key encrypter 130 encrypts the random number data with the SSL public key. After the user inputs the password, password encrypter 140 further encrypts the random number data, which has been encrypted with the SSL public key, using the password. The random number data encrypted with the SSL public key and the password is transmitted to server 2 via data transmitter 110.

Password decrypter 240 receives the random number data, which has been encrypted with the password and the SSL public key, via data receiver 211. Password decrypter 240 then decrypts the random number data, which has been encrypted with the password and the SSL public key, using the password registered in advance, so that the random number data encrypted with the SSL public key is derived.

Public key decrypter 230 decrypts the random number data, which has been encrypted with the SSL public key, using the SSL private key, so that the random number data is derived. Herein, the SSL private key corresponds to the SSL public key.

Next, hash processor 260 calculates a hash value of the random number data, and transmits the hash value to client 1 via data transmitter 210. Even when an attacker obtains the hash value of the random number data at this point, the attacker cannot back-calculate the hash value, and hence cannot derive the random number data. Accordingly, the attacker cannot derive the password through back-calculation. Herein, an MD5 or an SHA1 may be used as a hashing method. In addition, although the hash value is not encrypted herein, the hash value may be encrypted with the SSL common key for safer communication. In such a case, client 1 has to decrypt the encrypted hash value.

Server authenticator 190 receives the hash value of the random number data via data receiver 111, and compares the received hash value to the hash value of the random number data, which the client has calculated using hash processor 160. In other words, the client performs the server authentication. When the hash values match, it is determined that the server has the password. When the hash values do not match, it is determined that the server is fake. Although the user may have entered a wrong password, an intermediary attack is highly likely to be in progress when reentering the password several times still does not lead to a successful result.

When server authenticator 190 finishes the authentication, common key cryptographic communicator 150 encrypts the random number data with the SSL common key, and transmits the random number data encrypted with the SSL common key to server 2. Herein, since the random number data itself is presented to server 2, the random number data is encrypted with the SSL common key. However, the encryption is not necessary when hash-calculation, which is different from that performed in the server authentication, is performed on the random number data, so as to make a presentation. (The simplest method is that, instead of returning the hash value of the random number data to the client, the server returns data generated by further hashing the random number data (performing two phases of hashing) to the client, and the client returns the hash value of the random number data to the server.) In addition, since the server authentication has been finished as of this point, communication safety would not be threatened even when the authentic client gives the server the random number data encrypted with the SSL common key.

Common key cryptographic communicator 250 obtains the random number data, which has been encrypted with the SSL common key, via data receiver 211, and decrypts the encrypted random number data with the SSL common key, so that the ransom number data is derived.

Client authenticator 290 compares the previously obtained random number data to the derived random number data. When the random number data match, it is determined that the client has the password. When the random number data do not match, it is determined that the client is fake.

Client authenticator 290 notifies client 1 of completion of the authentication via data transmitter 210. Communicator 120 receives the authentication result via data receiver 111, and thereby is notified of completion of the authentication. However, the notification of authentication completion is not necessarily required since the client can transmit transmission data in asynchronization with the authentication completion notification. Since the attacker may initiate an online attack using an automated program, it is preferable that the authentication result be not revealed. However, notifying of authentication completion alone, not the authentication result, is acceptable.

In receiving the notification, communicator 120 prepares desired transmission data. Common key cryptographic communicator 150 encrypts the transmission data with the common key for SSL encryption communication, and transmits the encrypted transmission data to the server via data transmitter 110.

Common cryptographic communicator 220 receives the transmission data, which has been encrypted with the common key for SSL encryption communication, via data receiver 211. The transmission data encrypted with the common key for SSL encryption communication is decrypted with the SSL common key, and the decrypted transmission data is transmitted to communicator 220.

Finally, communicator 220 interprets the transmission data. Subsequently, regular SSL encryption communication is performed. Although the client initiates the data transmission herein, the server may initiate the data transmission.

(Problems Observed When Encryption is Performed in a Reverse Order from that of the Present Invention)

Figure 17:
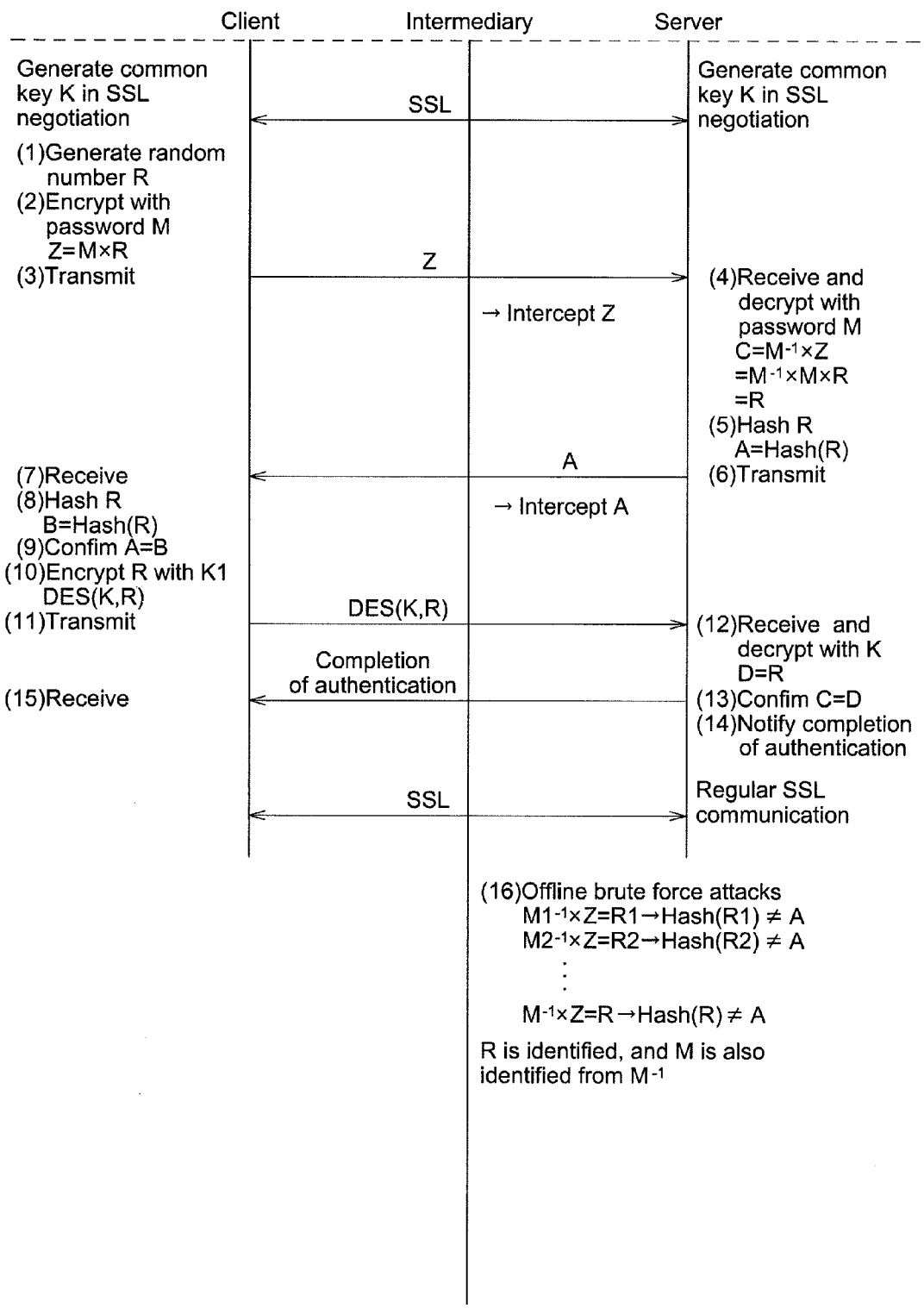
FIG. 17 shows that it is risky to encrypt random number R with the password alone.
Figure 19:
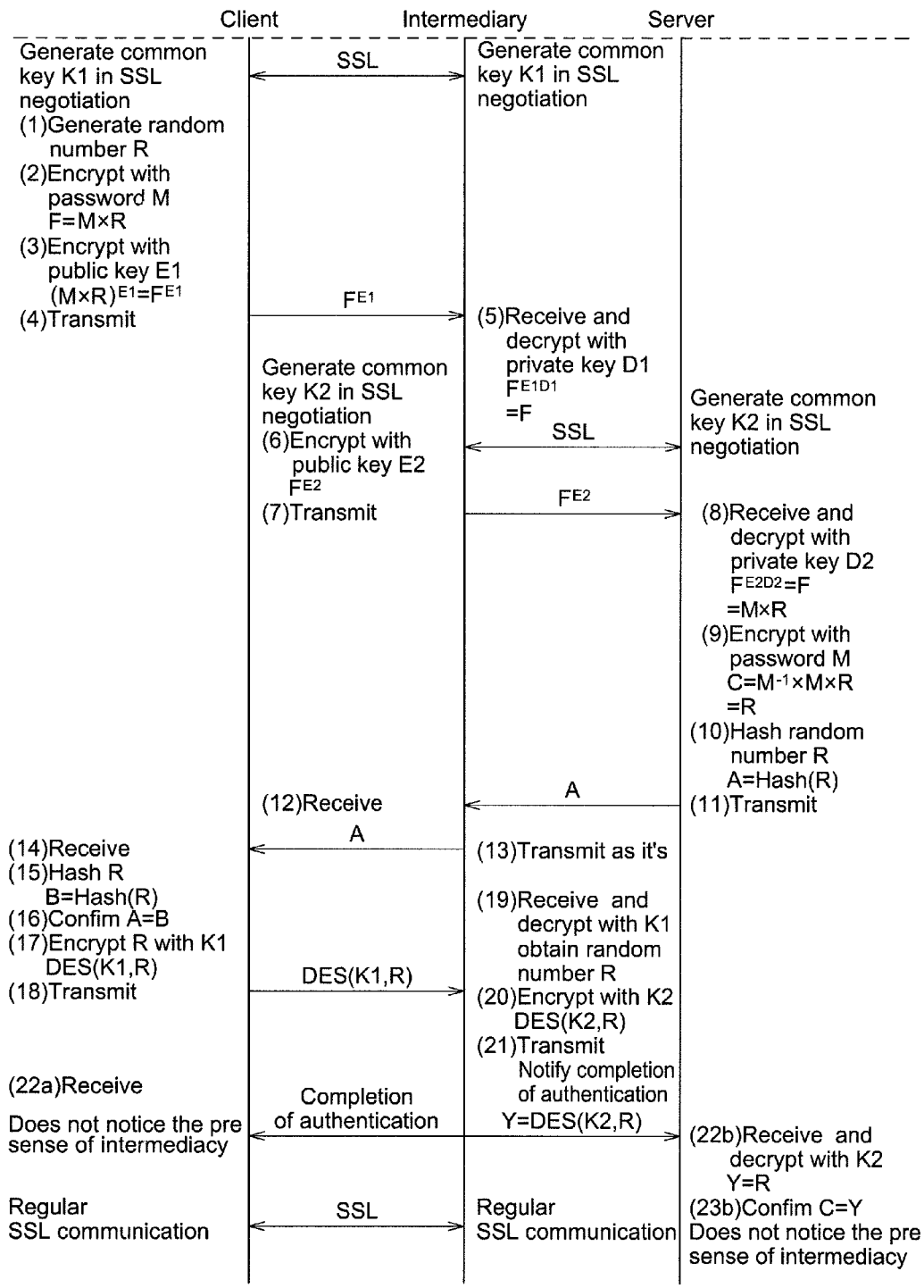
FIG. 19 shows that a through-pass attack succeeds when encryptions are performed in a reverse order from that of the example of FIG. 8.

FIG. 19 is a process flowchart indicating when the above-described online attack is initiated in an example in which two types encryptions are performed in a reverse order from that of the example shown in FIG. 8 of the present invention (a random number is encrypted with a password, and then with a public key). Password M is shared in advance between a client and a server, and unknown to an intermediary (attacker). In FIG. 19, the intermediary first masquerades as the server, and starts an SSL negotiation with the client. The intermediary generates public key E1, public key N1, and private key D1 in advance, which are not shown, and delivers public key E1 (in reality, public keys E1 and N1, and a description of N1 is omitted hereinafter unless otherwise required) to the authentic client through the SSL negotiation. Private key D1 (in reality, private key D1 and public key N1, and a description of N1 is also omitted hereinafter unless otherwise required) is kept by the intermediary. As a result of the SSL negotiation, the intermediary and the client generate common key K1. For example, an RSA is employed as a public key cipher, and DES is employed as a common key cipher. The bit lengths thereof are different from that of a password, and are long enough to prevent brute force attacks. The client (1) randomly generates random number R having a bit length long enough to prevent brute force attacks (e.g., 1024 bits), and, inversely with the present invention, (2) encrypts random number R with password M (the encrypted value is referred to as F), and (3) further encrypts value F with public key E1 (in reality, $(M \times R)^{E1}$ in the drawings should be "$M \times (R^{E1} \mod N1)$", and a description of "mod N1" is omitted hereinafter). (4) The client then transmits encrypted value F to the intermediary masquerading as the server. In receiving value F encrypted with public key E1, (5) the intermediary derives value F using its private key D1 with which data encrypted with public key E1 can be decrypted. However, since value F is random number R encrypted with password M, the intermediary cannot derive password M and random number R. (After deriving value F and value A that is to be described later, the intermediary can identify the password by an off-line attack initiated as shown in FIG. 17. A description of the same is omitted hereinafter.) Simultaneously with the above (1) to (4), the intermediary masquerades as the client, and starts the SSL negotiation with the server. The server generates public key E2, public key N2, and private key D2 in advance, which are not shown, and delivers public key E2 (in reality, public keys E2 and N2, and a description of N2 is omitted hereinafter unless otherwise required) to the authentic client through the SSL negotiation. Private key D2 (in reality, private key D2 and public key N2, and a description of N2 is also omitted hereinafter unless otherwise required) is kept by the server. As a result of the SSL negotiation, the server and the intermediary generate common key K2. Herein, similar to the above, for example, the RSA is employed as a public key cipher, and the DES is employed as a common key cipher. The intermediary (6) encrypts value F obtained previously from the client with public key E2 received from the server (in reality, $F^{E2}$ in the drawings should be "$F^{E2} \mod N2$", and a description of "mod N2" is omitted hereinafter), and then transmits the encrypted value F to the server. The server (8) derives value F using its private key D2 with which data encrypted with public key E2 can be decrypted. Value F is random number R encrypted with password M. Since the server also has password M, the server can (9) derive random number R by decrypting value F. Subsequently, the server (10) hashes random number R, and (11) transmits hash value A=Hash (R) to the intermediary masquerading as the client. (12) In receiving hash value A from the server, (13) the intermediary simply forwards hash value A to the authentic client. (14) In receiving hash value A from the intermediary masquerading as the server, (15) the client calculates hash value B by hashing random number R that has first been generated by the client. (16) The client then verifies whether hash value B matches hash value A received from the server (server authentication). Both hash value A and hash value B are Hash (R), and therefore these values match. Consequently, the client determines the intermediary to be the authentic server. In other words, the server authentication does not effectively function in this authentication method. (17) Value DES (K2, R) generated by encrypting random number R, which has been generated by the client, using common key K2 (18) is transmitted unintentionally to the intermediary masquerading as the server. The intermediary (19) shares common key K1 with the client, and therefore can easily derive random number R through decryption at this point. The intermediary (20) encrypts derived random number R with common key K2, and transmits value DES (K2, R) to the server, thereby succeeding in client authentication. (22*a*) The client mistakenly assumes that the authentic server has transmitted the authentication completion notification.

Therefore, the client remains unaware of the presence of the intermediary masquerading as the server. The client proceeds to perform the SSL negotiation with the intermediary masquerading as the server. As a result, the intermediary obtains important data such as personal information and the like of the client. At the server, (22b) random number R obtained by decrypting value DES (K2, R) with common key K2 matches the value obtained at (9) by decrypting value F with password M. Therefore, the sever remains unaware of the presence of the intermediary masquerading as the client. In this example, the DES is employed as a common key cryptosystem. Even when a cryptosystem more robust than the DES is employed, the intermediary can still easily succeed in the client authentication and the server authentication using the above deception, and hence can decrypt encrypted data transmitted and received between the client and the server.

(Features of the Present Invention to Resolve the Above-Mentioned Problems)

Figure 16:
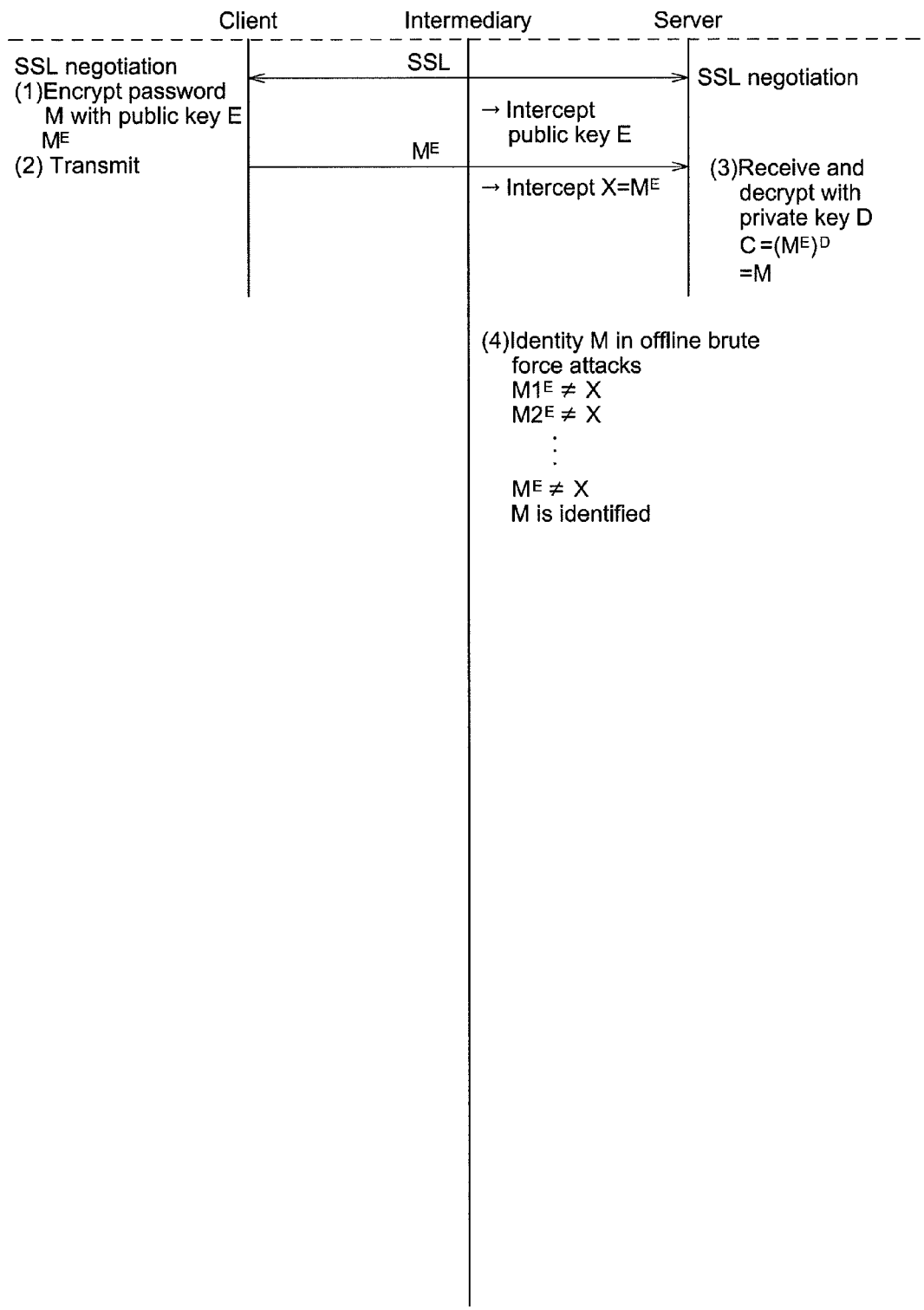
FIG. 16 shows that it is risky to directly encrypt a password.
Figure 18:
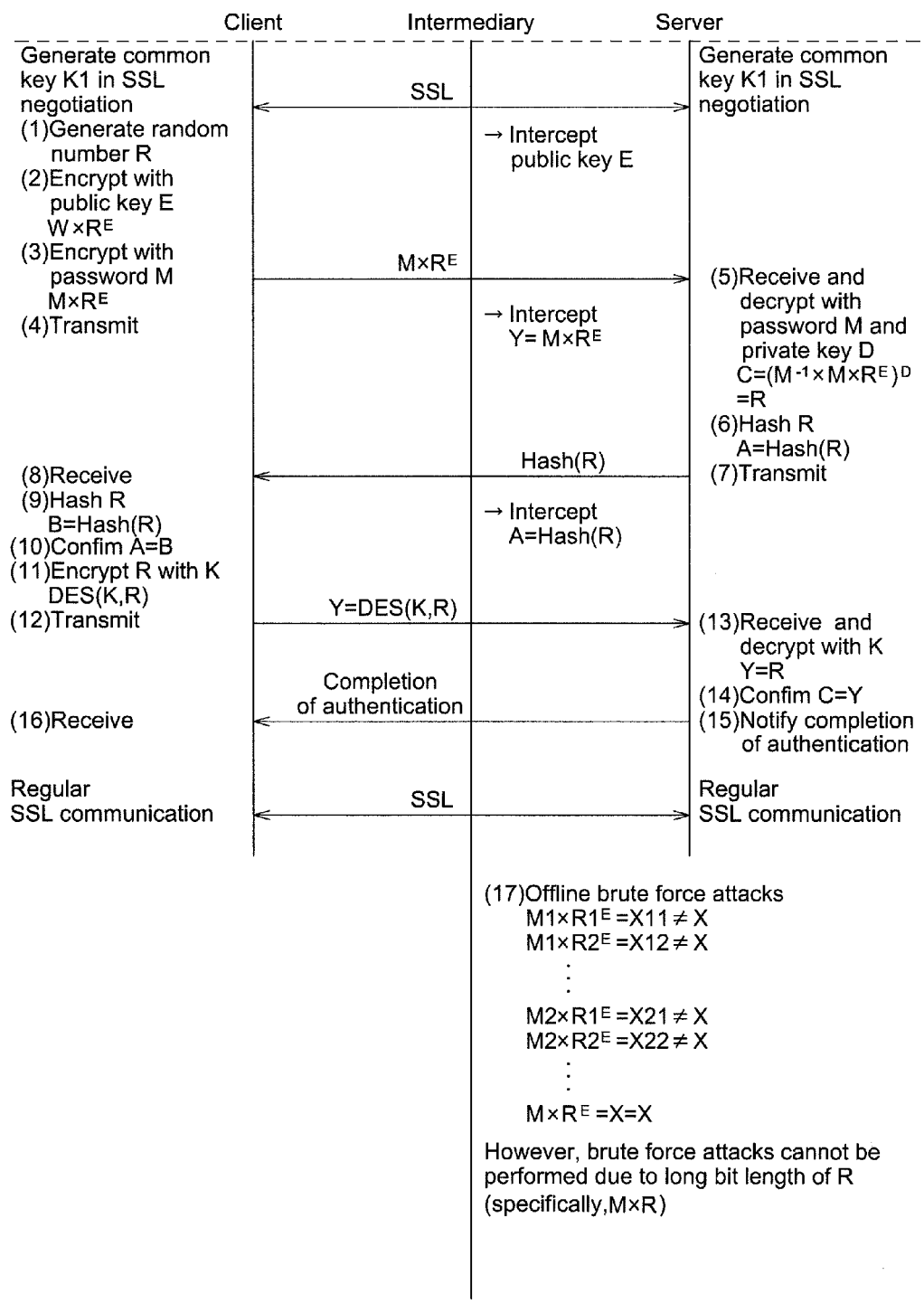
FIG. 18 shows that an off-line attack can be prevented by an authentication method in FIG. 8.
Figure 20:
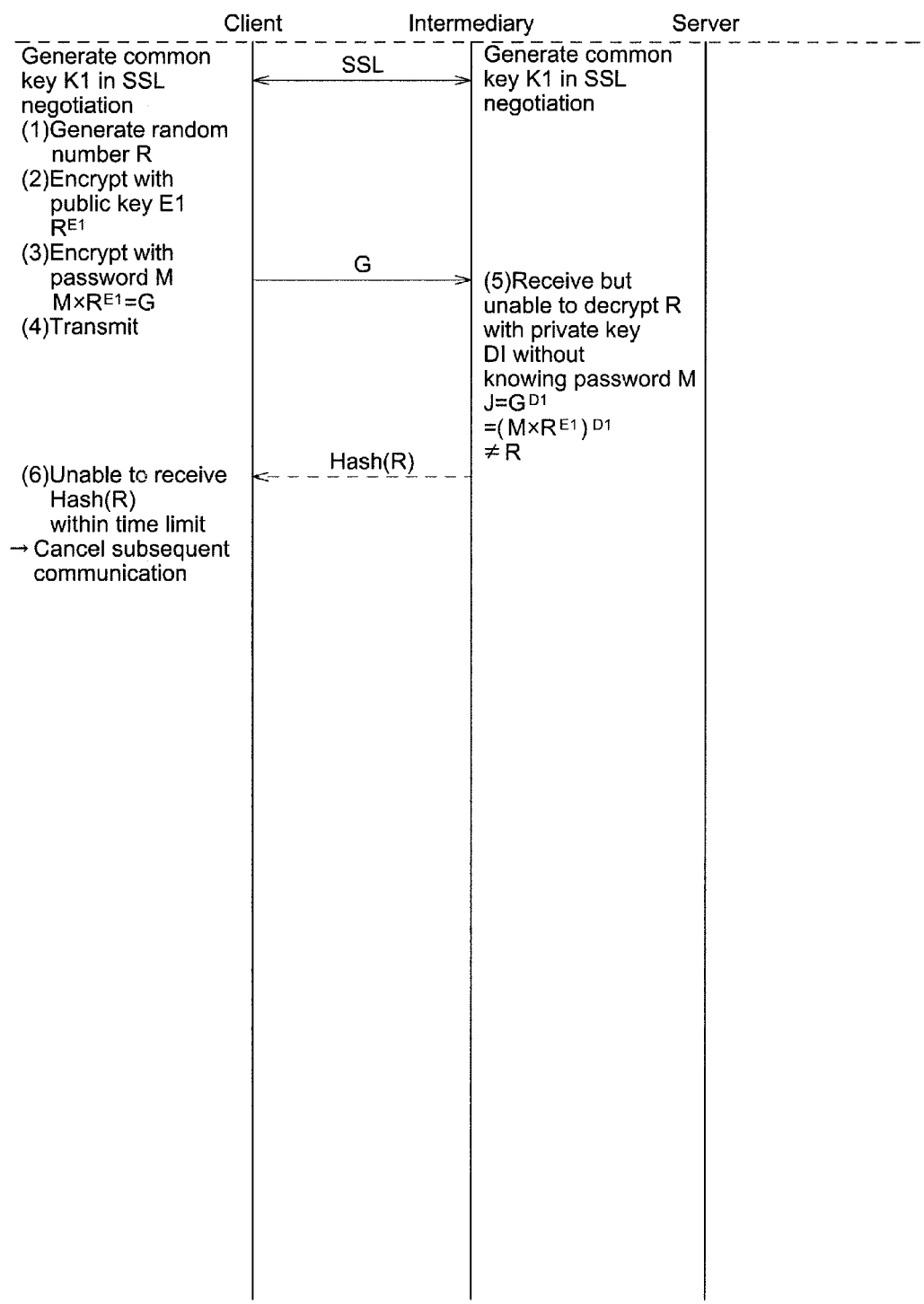
FIG. 20 shows that the through-pass attack can be prevented by the authentication method in FIG. 8.
Figure 21:
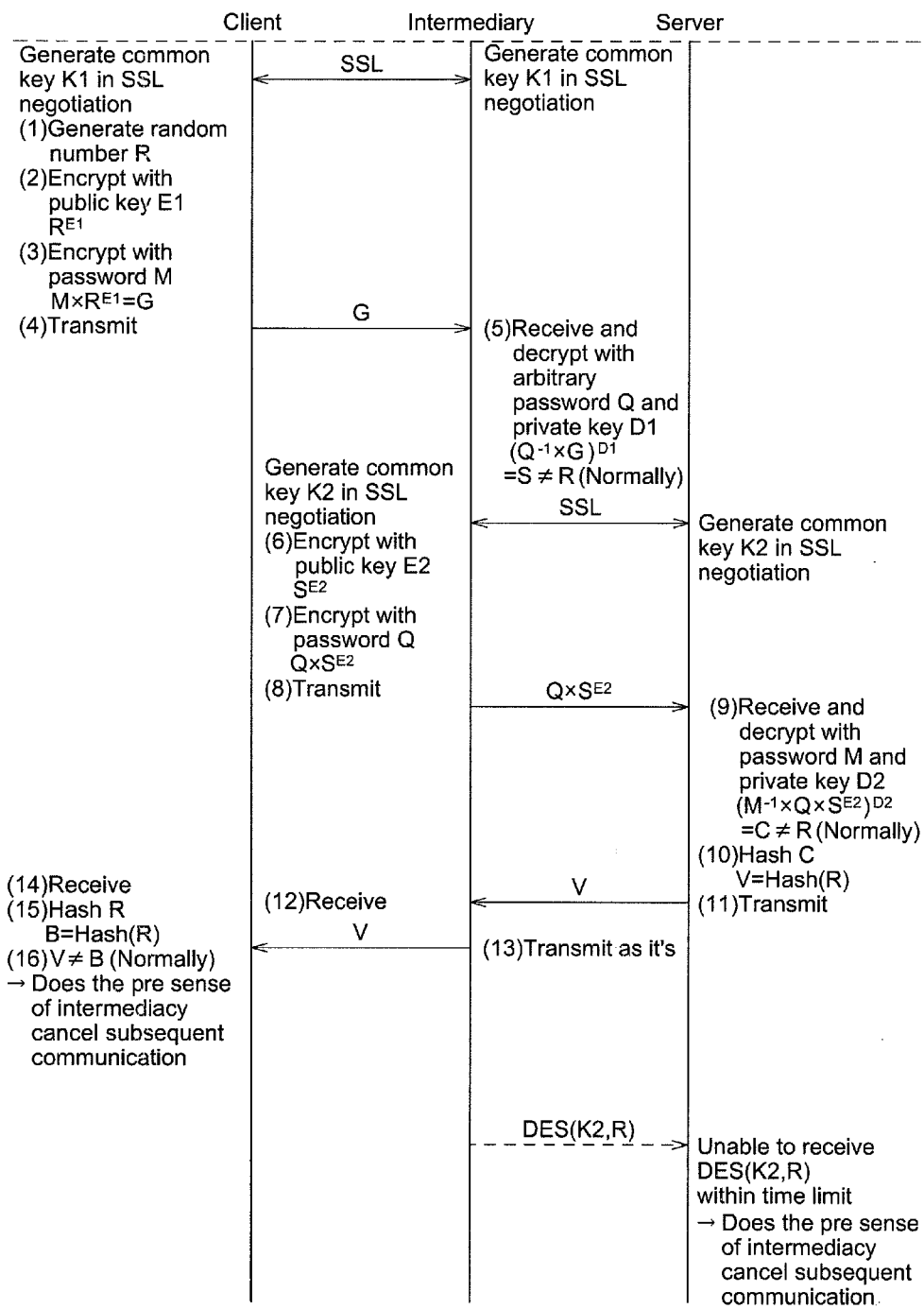
FIG. 21 shows that the through-pass attack can be prevented by the authentication method in FIG. 8.
Figure 22:
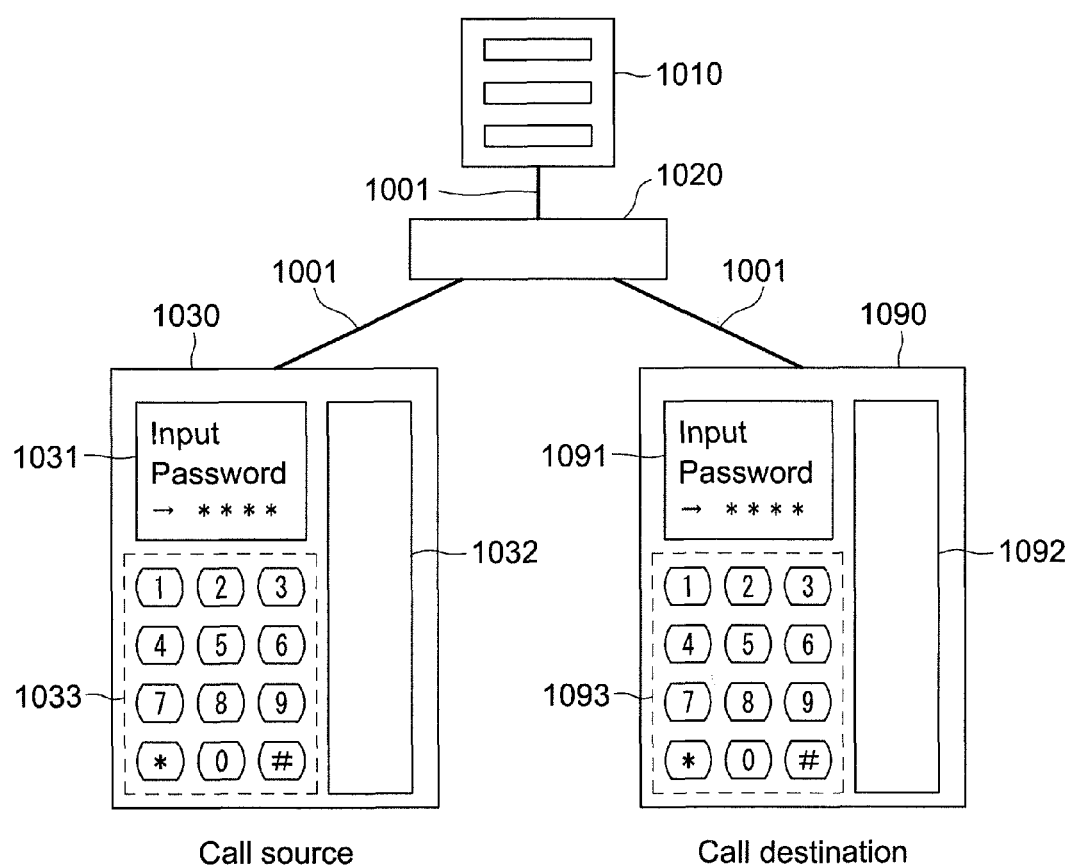
FIG. 22 is a configuration diagram showing a network PBX in an embodiment of the present invention.

On the other hand, as shown in FIGS. 20 and 21, off-line attacks are prevented even when there is an intermediary between the client and the server, which are authentic communication destinations to each other, by performing two types of encryptions in the same order as that of the example shown in FIG. 8. In FIG. 21, similar to the example shown in FIG. 19, the intermediary masquerades as the server, and starts an SSL negotiation with the client. The intermediary generates public key E1, public key N1, and private key D1 in advance, which are not shown, and delivers public key E1 (in reality, public keys E1 and N1, and a description of N1 is omitted hereinafter unless otherwise required) to the authentic client through the SSL negotiation. Private key D1 (in reality, private key D1 and public key N1, and a description of N1 is also omitted hereinafter unless otherwise required) is kept by the intermediary. As a result of the SSL negotiation, the intermediary and the server generate common key K1. The client (1) randomly generates random number data, and, similar to the present invention, (2) encrypts the random number data with public key E1 (in reality, $(M \times R)^{E1}$ in the drawings should be "$M \times (R^{E1} \mod N1)$", and a description of "mod N1" is omitted hereinafter). (3) The client further encrypts the encrypted random number data with password M. (4) The client then transmits resulting value G to the intermediary masquerading as the server. Although the intermediary receives value G, the intermediary (5) cannot derive random number $R^{E1}$ through back-calculation of value G without password M. Accordingly, although the intermediary has private key D1 with which data encrypted with public key E1 can be decrypted, the intermediary cannot derive random number R. Even when the intermediary derives value J by an attempt to decrypt value G with private key D1, value J rarely matches random number R (does not match when the password is made of 6-8 characters). The only way that may allow the intermediary to obtain random number R is to assume the password. Although passwords are vulnerable to off-line attacks, the passwords are approximately 36-60 bit long. Therefore, it is impossible to identify the password on the first attempt out of these combinations. (Passwords are unusable in any type of authentication where they can be identified on the first attempt.) As described above, the intermediary cannot derive random number R through decryption, and hence cannot calculate hash value Hash (R). Accordingly, the intermediary cannot transmit hash value Hash (R) to the client. Since the client does not receive correct hash value Hash (R) within a time limit, the client determines that a communication route to the server is not properly functioning or that an intermediary exists between the client and the server. Thereby, the client can stop further communication. Alternatively, the intermediary may respond as shown in FIG. 22. That is, after the client performs processes (1)-(4) in a manner similar to that shown in FIG. 21, the intermediary assumes the password to be Q, and obtains value S by decrypting value G with password Q and private key D1, with which data encrypted with public key E1 can be decrypted. As described above, the password is approximately 36-60 bit long, and there is hardly any chance that the password Q matches password M. Therefore, value S does not match random number R. (Passwords are unusable in any type of authentication where they can be identified on the first attempt.) Simultaneously with the above-described (1) to (4), the intermediary masquerades as the client, and starts the SSL negotiation with the server. The server generates public key E2, public key N2, and private key D2 in advance, which are not shown, and delivers public key E2 (in reality, public keys E2 and N2, and a description of N2 is omitted hereinafter unless otherwise required) to the authentic client through the SSL negotiation. Private key D2 (in reality, private key D2 and public key N2, and a description of N2 is also omitted hereinafter unless otherwise required.) is kept by the server. As a result of the SSL negotiation, the server and the intermediary generate common key K2. The intermediary (6) encrypts value S with public key E2 received from the server (in reality, $S^{E2}$ in the drawings is "$S^{E2} \mod N2$", and a description of "mod N2" is omitted hereinafter). (7) After further encrypting value S with password Q that has been randomly generated, (8) the intermediary transmits value $Q \times S^{E2}$ to the server. (9) The server derives value C using password M and private key D2 with which data encrypted with public key E2 can be decrypted. As described above, there is hardly any chance that password Q matches password M. Therefore, value C does not match random number R. Subsequently, the server (10) hashes value C, and (11) transmits hash value V=Hash (C) to the intermediary masquerading as the client. (12) In receiving the hash value V from the server, (13) the intermediary forwards hash value V received from the server to the authentic client. Of course, hash value V does not match Hash (R), which is hashed random number R. (14) In receiving hash value V from the intermediary masquerading as the server, (15) the client first calculates value B by hashing previously self-generated random number R, and verifies whether value B matches hash value V received from the intermediary masquerading as the server (server authentication). Since these values do not match, the client becomes aware of the presence of the intermediary between the client and the server. Thereby, the client can stop further communication. Accordingly, the intermediary is prevented from obtaining important data such as personal information of the client. After all, the intermediary cannot derive random number R, and hence cannot transmit to the server value DES (K2, R), which is random number R encrypted with common key K2. Since the server does not receive DES (K2, R) within a time limit, the server determines that a communication route to the client is not properly functioning or that an intermediary exists between the client and the server. Thereby, the server can stop further communication. Similar to the examples shown in FIGS. 16 and 17, the password is just approximately 36-60 bit long. However, unlike off-line attacks shown in FIGS. 16 and 17, in an online-attack shown in FIG. 22, the client can detect that hash values do not match in previous (16), unless the intermediary miraculously identifies the password on the first attempt. Thereby, at this point, the client can suspect the presence of the intermediary. The intermediary has no second chance when the intermediary fails on the first attempt. (Even when several attempts are allowed because there is a possibility that a valid user has entered a wrong password, it is practically impossible to identify the password where the password is approximately 36-60 bit long.) Accordingly, brute force attacks, such as off-line attacks, are not effective online, a bit length approximately that of a password is sufficient to ensure safety. As described above, even when encryption is performed with a password not having a large bit number, an extremely high level of safety can be ensured depending on a cryptosystem used in combination with the password. Passwords are vulnerable to off-line attacks, but are highly resistant to online attacks. On the other hand, a public key cryptosystem has features opposite from those of passwords. Therefore, a password and the public key cryptosystem can be combined so that the weaknesses are compensated for. This example has another advantage. Although random number R having a large bit number, 1024 bits, is used for authentication herein, random number R itself is automatically generated in an apparatus that a client uses. Similar to public keys E and N, the client does not have to set and memorize random number R having such a large bit number. The client only needs to set and memorize (theoretically, only approximately 36-60 bits of) password M composed of combination of 6-10 characters including alphanumeric characters, a number of symbols such as "@#%", and the like, which is momorizable by the client. This demonstrates that the present invention can provide simple intermediary prevention that ensures a high level of safety without burdening users. As described above, it is obvious that, in addition to the use of a combination of two types of cryptosystems, a public key cryptosystem and a password, the order of the cryptosystems in the combination is very important. In FIG. 18, the authentic server generates public key E, public key N, and private key D in advance, which are not shown, and delivers public key E to the authentic client through the SSL negotiation. Private key D is kept by the server. The server and the client generate common key K in the SSL negotiation. The client (1) generates random number R at random, and, similar to the present invention, (2) encrypts random number R with public key E, so that value W is generated. (3) The client further encrypts value W with password M, and then (4) transmits resulting value Y to the server. In receiving encrypted value Y, since the client has password M and private key D, with which data encrypted with public key E can be decrypted, (5) the client can derive random number R by decrypting value Y. Subsequently, the server (6) hashes random number R, and (7) transmits hash value A=Hash (R) to the client. (8) In receiving hash value A from the server, the client (9) calculates value B by hashing previously self-generated random number R, and (10) verifies authenticity of the server by verifying whether value B matches hash value A received from the server (server authentication). In reality, both hash value A and hash value B are Hash (R), and therefore these values match. Then, the client (11) encrypts previously self-generated random number R with common key K, and (12) transmits resulting value DES (K, R) to the server. The server shares common key K with the client, and thereby (13) derives random number R by decrypting value DES (K, R) with common key K. (14) The client can verify authenticity of its communication destination by verifying whether random number R matches the value derived by decrypting value Y with private key D and password M (client authentication). The server notifies the client of completion of the authentication, at which the server and the client starts regular SSL encryption communication. The notification of authentication completion is not necessarily required. Although password M and random number R are both unknown to the intermediary, the intermediary can intercepts public key E, value Y that is generated by encrypting random number R with public key E and further with password M, and hash value A. However, the intermediary has neither password M nor private key D. In FIG. 18 as well, password M is theoretically just approximately 36-60 bit long. Although the intermediary (17) attempts to derive a value that matches $R^E$ and Hash (R) by generating all types of possible passwords M1, M2, (in reality, all numbers 1, 2, . . . are sequentially checked as value M); by deriving $R1^E$, $R2^E$, . . . through back-calculation of value Y with the possible passwords; by generating all types of possible random numbers R1, R2, . . . ; and by verifying the possible random numbers by a brute force attack (in reality, all numbers 1, 2, . . . are sequentially checked as value R), the attempt does not succeed by the brute force attack. This is because random numbers have much longer bit lengths than those of passwords. (Although an analysis is conducted for a period of 100 years with a computer that costs approximately 1 trillion yen, the solution cannot be derived.) In a method shown in FIG. 18, M and R have to be checked by a brute force attack, individually, (M×R has to be analyzed in combination, such that, assuming M is value 1, all possible values of R have to be checked. If M1 does not lead to a successful result, assuming M is value 2, all possible value of R have to be checked again.), and therefore an analysis takes much longer. In order to expedite the analysis, the intermediary may attempt to derive private key D from public keys E and N to decrypt $R1^E$, $R2^E$, . . . . As the difficulty of deriving private key D from public key E (in other words, safety of public key ciphers) has already been known, such an attempt does not succeed. As described above, off-line attacks do not succeed in the method in FIG. 19. As described above, regardless of the fact that two types of encryptions are used in the same order as or in the reverse order from that of the example shown in FIG. 8, a high level of safety is ensured against off-line attacks. Actually, the importance of the order of the use of two types of encryptions becomes evident in online attacks.

The above are descriptions of the concept of the present invention. The embodiments of the present invention are explained in the following with reference to the above-described drawings.

Figure 1:
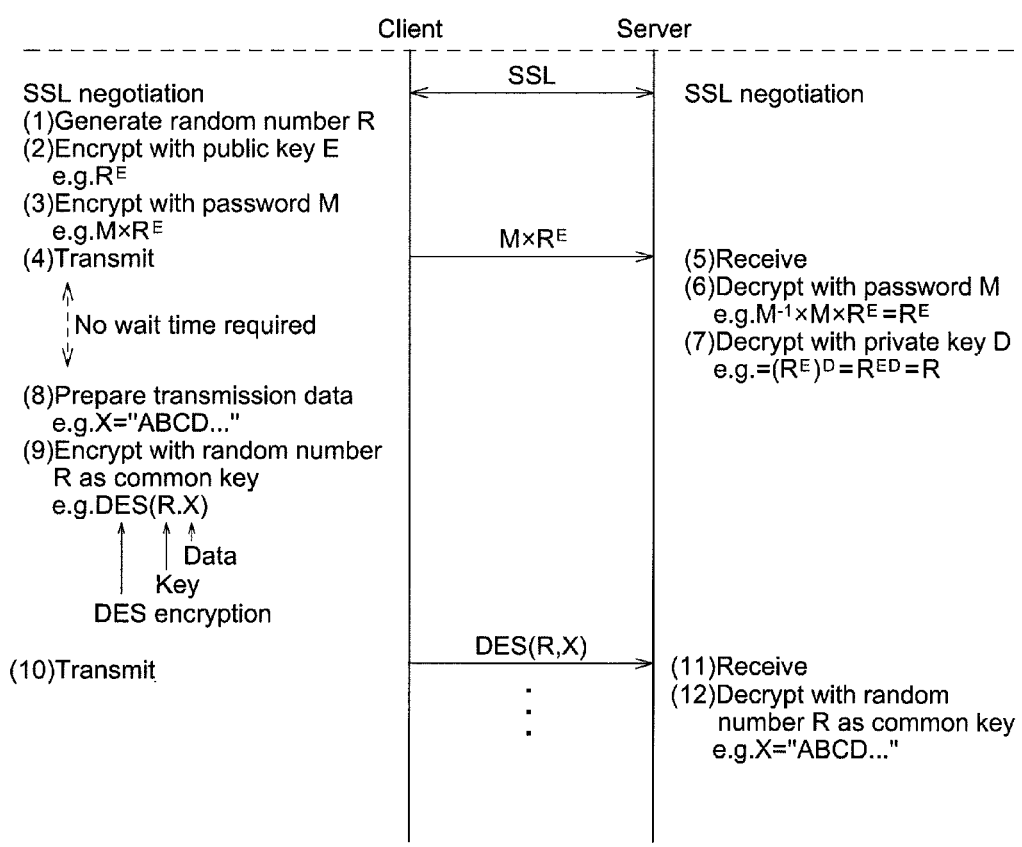
FIG. 1 is a flowchart showing one example of a confidential communication method according to the present invention.

FIG. 1 is a flowchart showing one example of a confidential communication method according to the present invention. The confidential communication method provides safe cryptographic communication by using random number data transmitted and received between a client and a server as a common key.

A regular SSL negotiation is performed between the client and the server. At this point, the client obtains a public key used in SSL encryption communication (hereinafter, referred to as an SSL public key) from the server. The public key may be delivered not only in the SSL encryption communication, but also via e-mail or by hand. Any method may be used to deliver the public key.

The client (1) generates the random number data, and (2) encrypts the random number data with the SSL public key. Herein, it is preferable that the random number data have a cryptographically-safe bit length so that off-line attacks are prevented. (3) The random number data encrypted with the SSL public key is further encrypted with a password. (Although password M and random number R are multiplied in the drawing, the present invention is not limited to this cryptographic method. Encryption may be performed in DES and AES with password M itself or a common key originating from password M. The same applies in the following drawings.) As long as the password bit length is not extremely short, this method makes intermediary attacks difficult, and provides safety. However, when the encryption is performed in a different order, intermediary attacks are established. Therefore, the encryption has to be performed in the correct order. Then, (4) the random number data encrypted with the password and the SSL public key is transmitted to the server.

Meanwhile, the server (5) receives the random number data encrypted with the password and the SSL public key from the client. (6) The server then decrypts the random number data, which has been encrypted with the password and the SSL public key, using the password, and thereby derives the random number data encrypted with the SSL public key. Even when an attacker masquerades as the server at this point, the attacker cannot decrypt the random number data without the password. In addition, since there is no clue except for the encrypted random number data, it is difficult for the attacker to initiate off-line attacks as well. How the server identifies the client's password is not described herein. However, for example, similar to regular password authentication, the client may transmit an ID that specifies the password so that the server can identify the client's password. Another method in which the server stores the password in relation to the client's communication destination information may be used.

Next, (7) the random number data encrypted with the SSL public key is decrypted with the server's private key used in the SSL encryption communication (hereinafter, referred to as an SSL private key), so that the random number data is derived.

The client (8) prepares transmission data, and (9) encrypts the transmission data with the random number data as the common key. (10) The client then transmits the transmission data encrypted with the random number data to the server. The common key may be the random number itself or originate from the random number data. The same applies in the following drawings.

(11) The server receives the transmission data encrypted with the random number data from the client. (12) The server then decrypts the transmission data, which has been encrypted with the random number data, using the random number data as the common key, and thereby derives the transmission data. Although FIG. 1 shows DES as an example of a common key cryptosystem, AES may also be used. As long as safety is provided, any cryptosystem may be used.

Thereby, an intermediary not having the password is eliminated, and safe cryptographic communication can be performed. Although the client prepares the transmission data first herein, the server may prepare the transmission data first. When the client transmits the transmission data first, the transmission data does not have to be transmitted in synchronization with transmission of the random number data, and may be transmitted at any time. However, when the server transmits the transmission data first, the transmission data has to be transmitted in synchronization with transmission of the random number data since the server encrypts the transmission data after obtaining the random number data.

Figure 2:
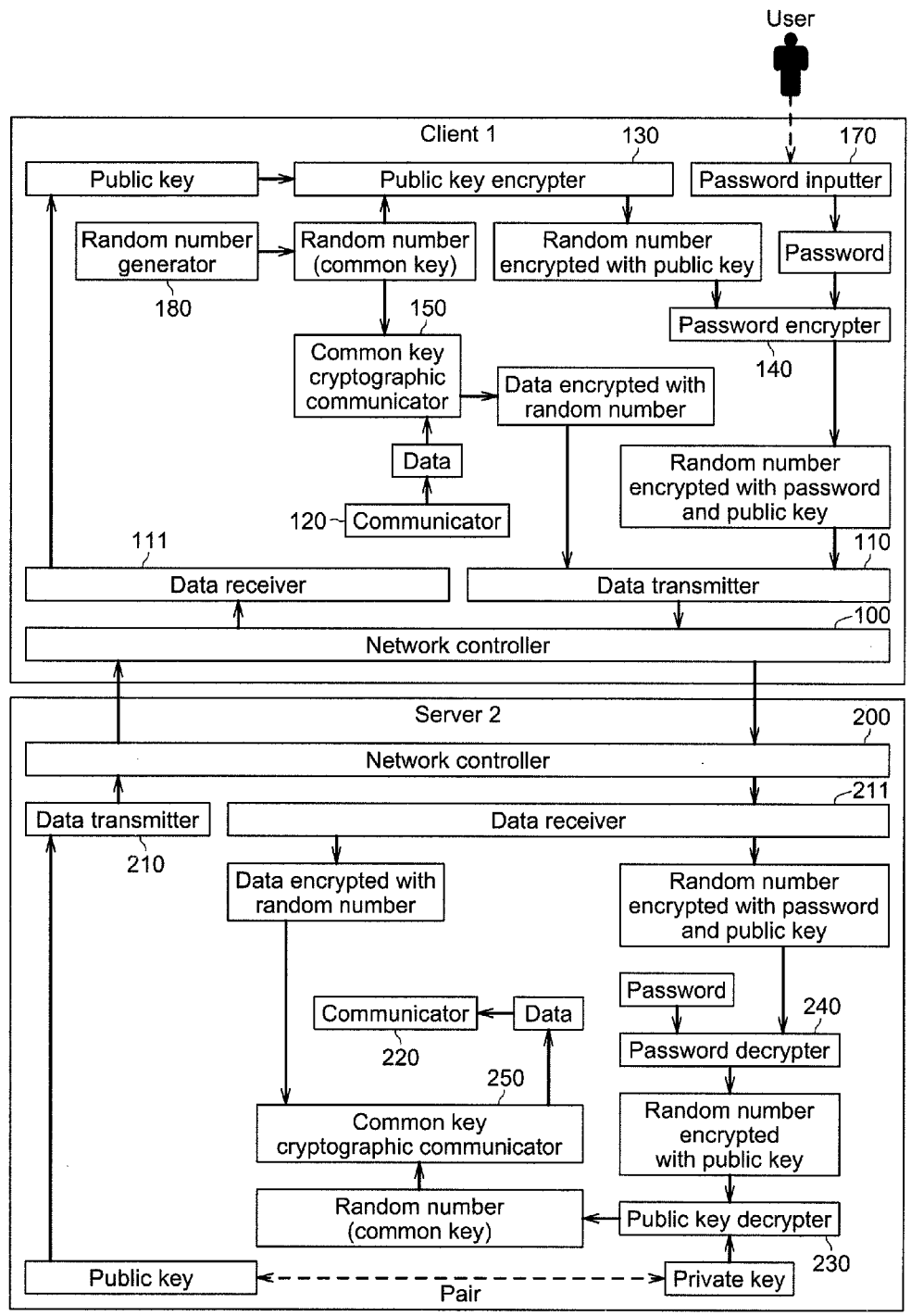
FIG. 2 is a block diagram of FIG. 1.

FIG. 2 is a block diagram of FIG. 1. The client obtains the password from a user using password inputter 170, and performs confidential communication with the server storing the password in advance. Similar to the server, the client may store and retain the password in advance. When the user goes to the server at the time of use (e.g., when the sever is a printer) and when a terminal at the server side is also used by a user who is different from the user at the client side (e.g., a client/server type conference system), a password at the server side may also be input by the user. The same applies in the following drawings.

First, client 1 connects to server 2, and performs an SSL negotiation. At this point, client 1 obtains the SSL public key of server 2. Before or after the SSL negotiation, client 1 requests the user to input the password using password inputter 170.

The user inputs the password using password inputter 170. In asynchronization with this, random number data generator 180 generates the random number data. Public key encrypter 130 encrypts the random number data with the SSL public key. After the user inputs the password, password encrypter 140 further encrypts the random number data, which has been encrypted with the SSL public key, using the password. The random number data encrypted with the SSL public key and the password is transmitted to server 2 via data transmitter 110.

Password decrypter 240 receives the random number data, which has been encrypted with the SSL public key and the password, via data receiver 211. Password decrypter 240 then decrypts the random number data, which has been encrypted with the SSL public key and the password, using the password registered in advance, and thereby derives the random number data encrypted with the SSL public key.

Public key decrypter 230 decrypts the random number data, which has been encrypted with the SSL public key, using the SSL private key, and thereby derives the random number data. Herein, the SSL private key corresponds to the SSL public key.

Communicator 120 prepares desired transmission data, and transmits the transmission data to common cryptographic communicator 150. Common key cryptographic communicator 150 encrypts the transmission data with the random number data as the common key, and transmits the encrypted transmission data to server 2 via data transmitter 110.

Common cryptographic communicator 250 receives the random number data, which has been encrypted with the common key, via data receiver 211. The transmission data encrypted with the common key is decrypted with the random number data as the common key, and the random number data is transmitted to communicator 220. Communicator 220 interprets the transmission data transmitted from the client.

Figure 3:
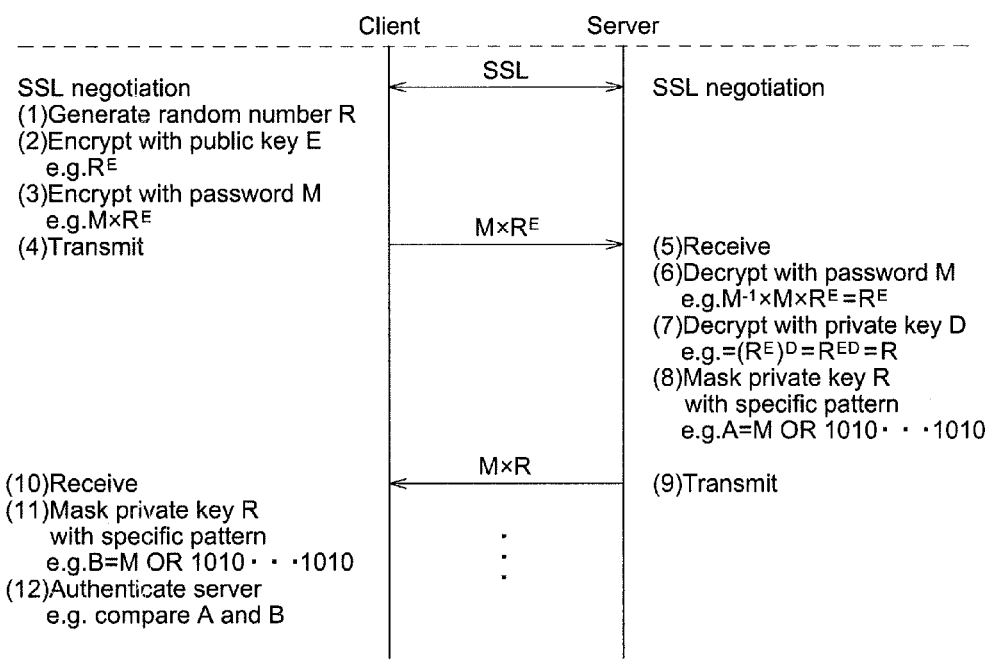
FIG. 3 is a flowchart showing another example of the confidential communication method according to the present invention.

FIG. 3 is a flowchart showing one example of the confidential communication method according to the present invention. In the confidential communication, the client performs server authentication to verify whether the server is an attacker masquerading as the server. A difference from FIG. 1 is that, after deriving the random number data, the server presents the random number data to the client for the server authentication.

Processes (1) to (7) are the same as those in FIG. 1. The server (8) masks the derived random number data with a specific bit pattern, and (9) transmits the masked random number data to the client. Although the derived random number is masked with a specific bit pattern herein, any method may be used as long as the data can be processed confidentially from a third party. For example, one of preferable methods is to process the data with a one-way function, such as a hash function. Herein, presenting the random number data itself or the random number data encrypted with the password is risky, since intermediary attacks could be established.

(10) The client receives the masked random number data. Similar to the server, the client (11) masks the self-generated random number data, and (12) compares the resulting data to the masked random number data obtained from the server. In other words, the client performs the server authentication. When the data match, it is determined that the server has the password. When the data do not match, it is determined that the server is fake. There is a possibility that the user has entered a wrong password. However, when several entries of the password still do not lead to a successful result, an intermediary attack is highly likely to be in progress.

After the above-described processes, a common key encryption may be applied using the random number data as a common key, similar to the processes following (8) in FIG. 1.

Figure 4:
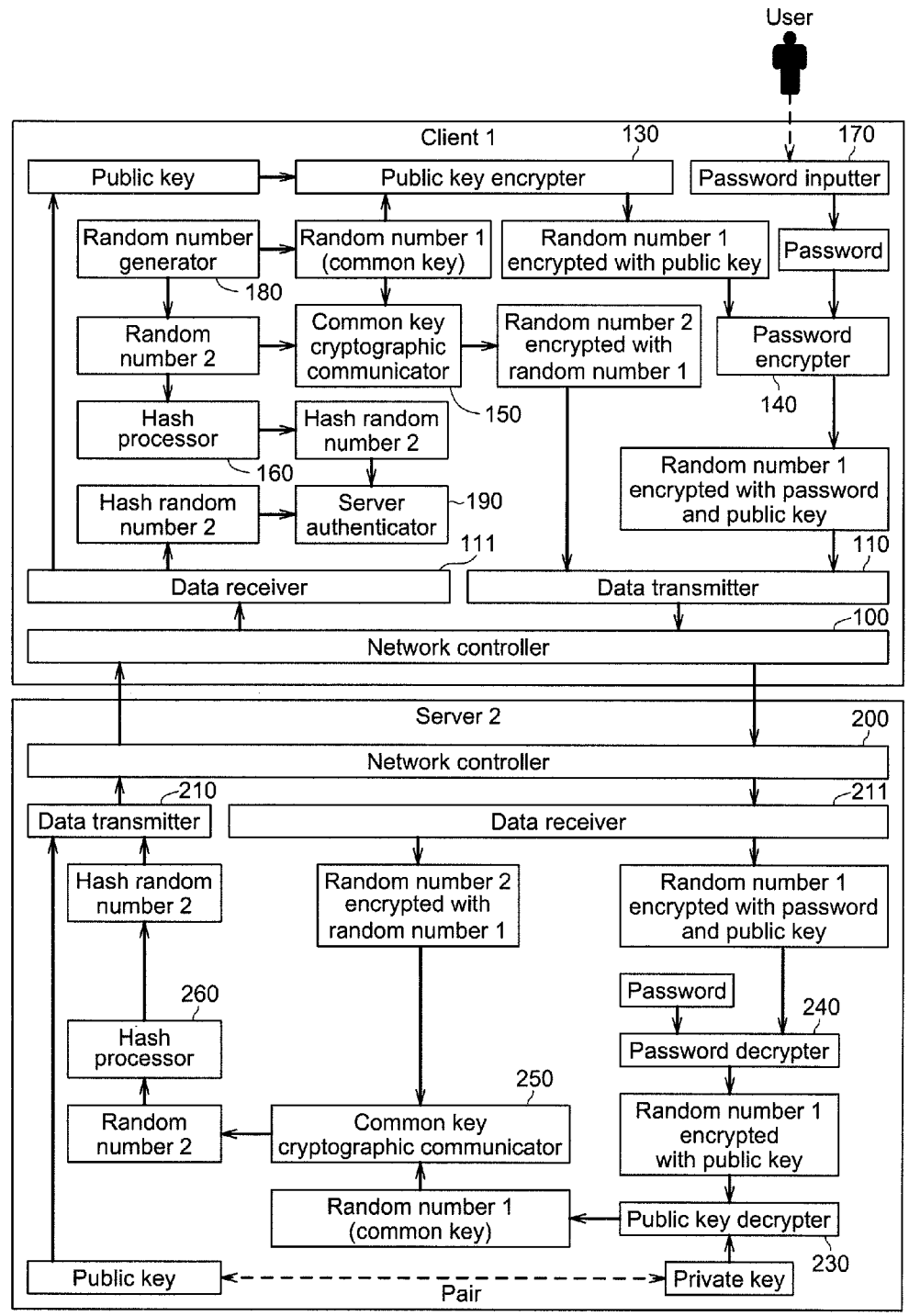
FIG. 4 is a block diagram showing another example of the confidential communication method according to the present invention.

FIG. 4 is a block diagram showing one example of a confidential communication method according to the present invention. In this server authentication, the client separately prepares authentication data that is different from the random number data, and transmits the authentication data to the server. Then, the client makes a determination based on whether the server can present the authentication data to the client.

First, client 1 connects to the server, and performs the SSL negotiation. At this point, client 1 obtains the SSL public key of server 2. Before or after the SSL negotiation, client 1 requests a user to input a password using password inputter 170.

The user inputs the password using password inputter 170. In asynchronization with this, random number data generator 180 generates random number data 1 (a common key). Public key encrypter 130 encrypts random number data 1 with the SSL public key. After the user inputs the password, password encrypter 140 further encrypts random number data 1, which has been encrypted with the SSL public key, using the password. Random number data 1 encrypted with the password and the SSL public key is transmitted to the server via data transmitter 110.

Password decrypter 240 receives random number data 1, which has been encrypted with the password and the SSL public key, via data receiver 211. Password decrypter 240 then decrypts random number data 1, which has been encrypted with the password and the SSL public key, using the password registered in advance, and thereby derives random number data 1 encrypted with the SSL public key.

Public key decrypter 230 decrypts random number data 1, which has been encrypted with the SSL public key, using the SSL private key, and thereby derives random number data 1 (the common key). Herein, the SSL private key corresponds to the SSL public key.

Random number generator 180 generates random number data 2 (authorization data). Common key cryptographic communicator 150 encrypts random number data 2 with random number data 1 as the common key, and transmits encrypted random number data 2 to server 2 via data transmitter 110. Random number data 2 does not have to be generated in synchronization with generation of random number data 1. Random number data 1 (the common key) is necessary at the time of encrypting random number data 2. However, random number data 2 may be transmitted in synchronization with transmission of random number data 1.

Common key cryptographic communicator 250 receives encrypted random number data 2 via data receiver 211. Common key cryptographic communicator 250 then decrypts random number data 2 with random number data 1 as the common key, and thereby derives random number data 2.

Hash processor 260 calculates a hash value of random number data 2, and transmits the hash value to the client via data transmitter 210. Even when an attacker obtains the hash value of random number data 2 at this point, the attacker cannot derive random number data 2 since back-calculation is impossible. Therefore, the attacker cannot back-calculate random number data 1 or the password, either. Herein, an MD5 or an SHA1 may be used as a hash method. In addition, although the hash value is not encrypted herein, the hash value may be encrypted with random number data 1 for safer communication. In such a case, the client has to decrypt the encrypted hash value.

Server authenticator 190 receives the hash value of random number data 2 via data receiver 111, and compares the received hash value to the hash value of random number data 2, which the client has obtained through calculation by hash processor 160. In other words, server authentication is performed. When the hash values match, it is determined that the server has the password. When the hash values do not match, it is determined that the server is fake. There is a possibility that the user has entered a wrong password. However, when reentering the password several times still does not lead to a successful result, an intermediary attack is highly likely to be in progress.

Herein, random number data 2, which is different from random number data 1 (the common key), is used for the server authentication. However, the server authentication can be performed by presenting random number data 1 in the same method as that used for presenting random number data 2. Therefore, random number data 2 is not necessarily required for authentication.

Figure 5:
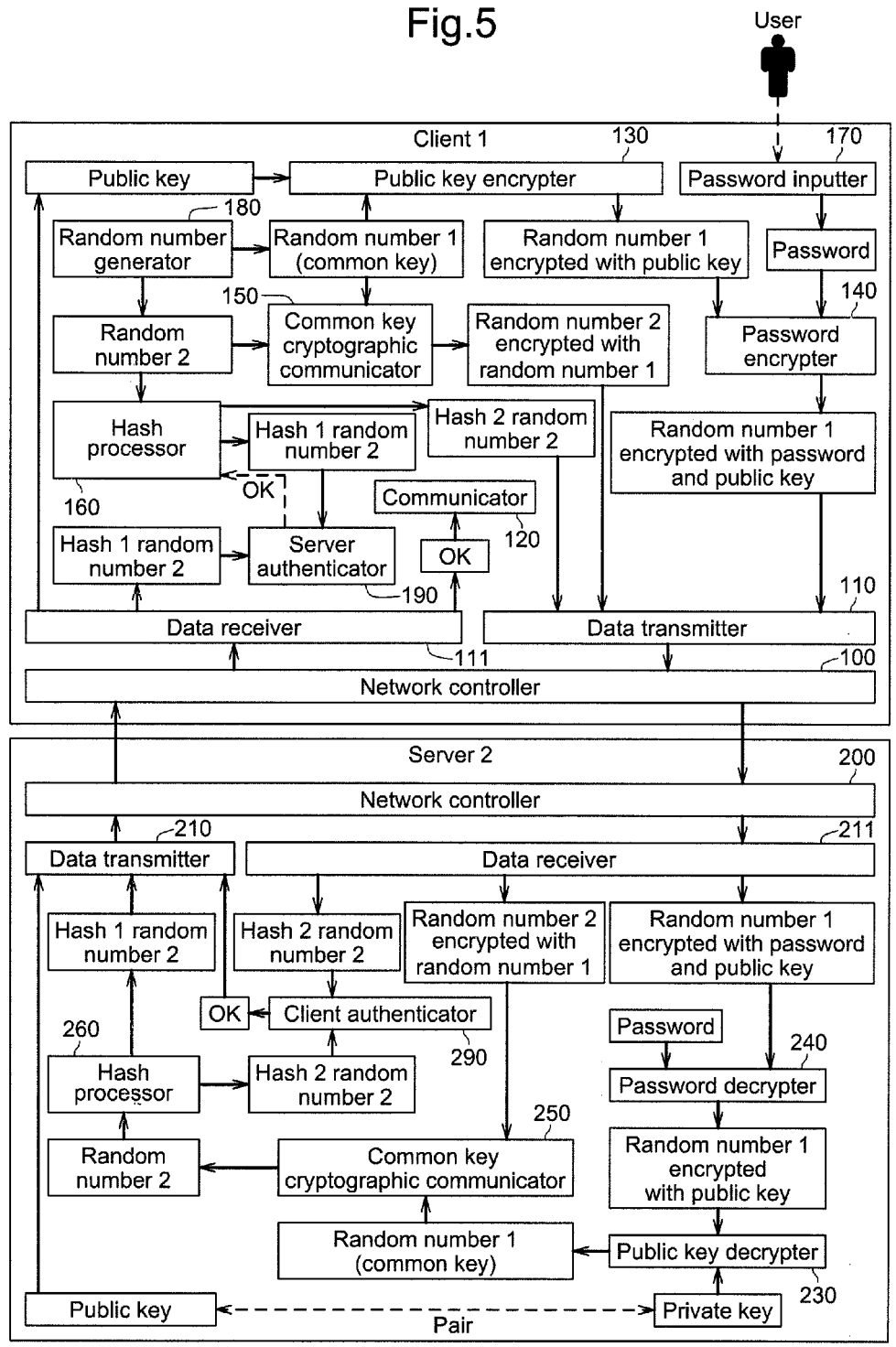
FIG. 5 is a block diagram showing another example of the confidential communication method according to the present invention.

FIG. 5 is a block diagram showing one example of a confidential communication method according to the present invention. In this confidential communication method, since client authentication is performed in addition to the server authentication, it can be verified whether an attacker masquerades as the client and the server. The processes are the same as those in FIG. 4 up to the process in which the server presents random number data 2 to the client. Subsequently, the client presents random number data 2 to the server for the client authentication.

Descriptions of the processes are the same as those in FIG. 4 up to the process in which server authenticator 190 performs the server authentication. When the server authentication is finished in server authenticator 190, hash processor 160 calculates a hash value of random number data 2, and transmits the hash value of random number data 2 to server 2. The hash calculation performed herein has to be different from that performed in the server authentication in FIG. 4. For example, a different hash algorism may be used in calculation, such that an MD5 is used in the server authentication while an SHA1 is used for the client authentication. Alternatively, the same hash algorism may be used in calculation with a different initial value. (The simplest method is that, instead of returning the hash value of random number data 2 to the client, the server returns data generated by further hashing of the random number data (performing two phases of hashing) to the client, and the client returns the hash value of random number data 2 to the server.)

Client authenticator 290 receives the hash value of random number data 2 via data receiver 211, and compares the received hash value to the hash value of random number data 2, which the server has calculated using hash processor 260. When the hash values match, it is determined that the client has the password. When the hash values do not match, it is determined that the client is fake.

Herein, as shown in FIG. 4, random number data 2, not random number data 1, is used for the client authentication. However, similar to the descriptions of FIG. 4, the client authentication can be performed by presenting random number data 1 in the same method as that used to present random number data 2. In the client authentication, the random number to be presented to the server does not have to be hashed since authenticity of the server has been verified in the server authentication. In the SSL encryption communication between the client and the server, the random number may be encrypted with a common key generated in the SSL negotiation.

Finally, client authenticator 290 notifies the server of an authentication result via data transmitter 210. Communicator 120 receives the authentication result via data receiver 111, and thereby is notified of completion of the client authentication. However, the client does not necessarily have to be notified of the authentication result since the client can subsequently transmit data in asynchronization with the authentication result. Since an attacker might initiate an online attack using an automated program, it is preferable that the client be not notified of the authentication result. However, notifying the client of completion of the authentication completion alone, not the authentication result, is acceptable.

Figure 6:
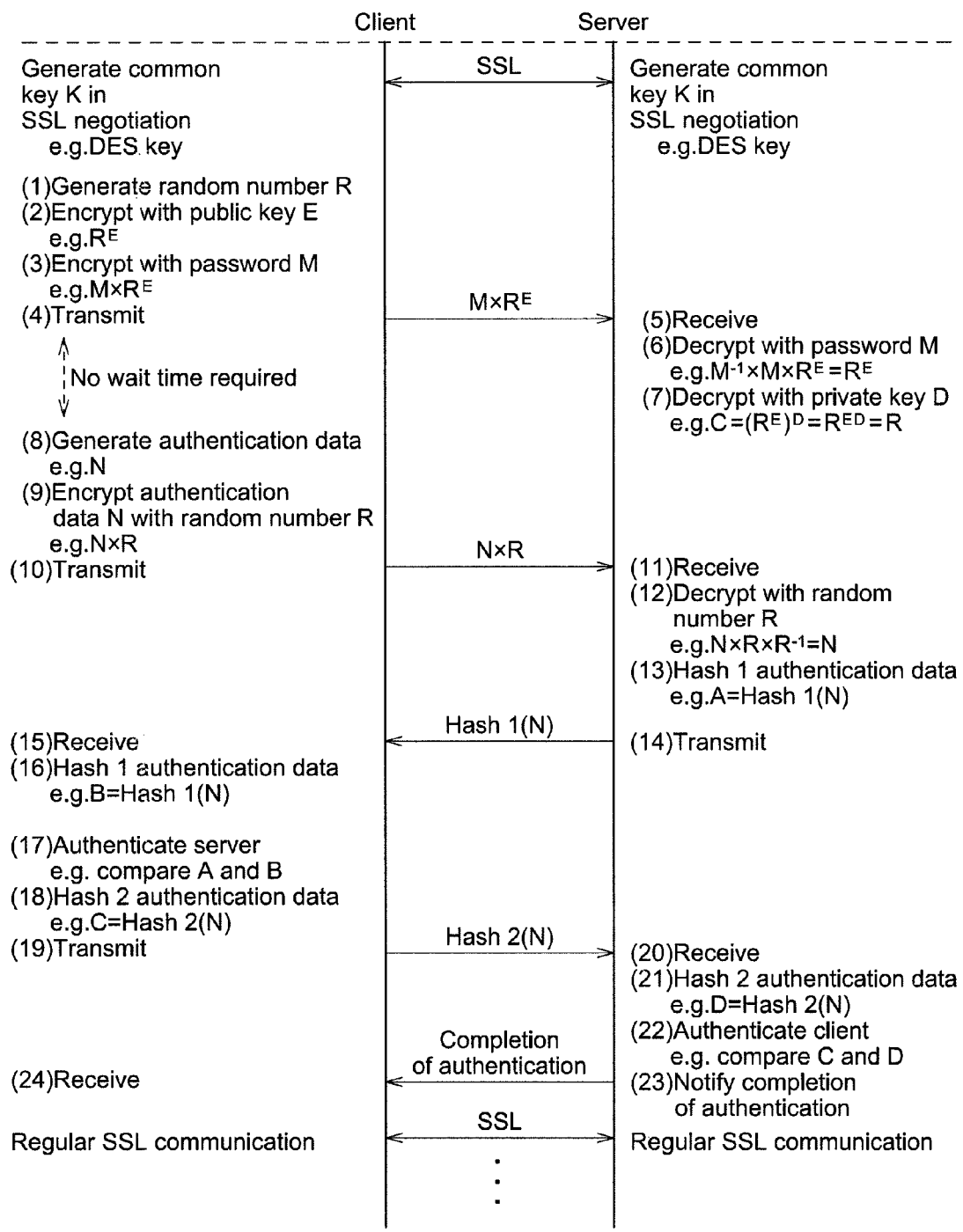
FIG. 6 is a flowchart showing another example of the confidential communication method according to the present invention.

FIG. 6 is a flowchart showing one example of a confidential communication method according to the present invention. In the confidential communication, the client and the server perform mutual authentication to eliminate an intermediary, so that safe cryptographic communication is performed simply by using a common key of the SSL encryption communication. The processes are the same as those of the flowchart in FIG. 4 up to the process in which the server presents random number data 2 to the client. The following processes are the same as those of the flowchart in FIG. 5 up to the process in which the client presents random number data 2 to the server.

The regular SSL negotiation is performed between the client and the server. At this point, the client obtains the server's SSL public key. In addition, at this point, the type of common key cipher system used in the SSL encryption communication is determined. Although DES is used in FIG. 6, the present invention is not limited to this cipher system.

The client (1) generates random number data, and (2) encrypts the random number data with the SSL public key. It is preferable that the random number data have a cryptographically-safe bit length so that off-line attacks are prevented. (3) The random number data encrypted with the SSL public key is further encrypted with the password. As long as the password bit length is not extremely short, this method makes intermediary attacks difficult, and provides safety. However, when the encryption is performed in a different order, intermediary attacks are established. Therefore, the encryption has to be performed in the correct order. Then, (4) the random number data encrypted with the password and the SSL public key is transmitted to the server.

Meanwhile, (5) the server receives the random number data encrypted with the password and the SSL public key from the client. (6) The server then decrypts the random number data, which has been encrypted with the password and the SSL public key, using the password, so that the server derives the random number data encrypted with the SSL public key. How the server identifies the client's password is not described herein. However, for example, similar to regular password authentication, the client may transmit an ID that specifies the password so that the server can identify the client's password. Alternatively, the server may store the password in relation to the client's communication destination information.

Next, (7) the random number data encrypted with the SSL public key is decrypted with the server's SSL private key, so that the random number data is derived. At this point, even when an attacker masquerades as the server, the attacker cannot decrypt the random number data without the password. In addition, since there is no clue except for the encrypted random number data, it is difficult for the attacker to initiate off-line attacks as well.

The client (8) prepares the authentication data (different random number data), and (9) encrypts the authentication data with the random number data. (10) The client then transmits the authentication data encrypted with the random number data to the server.

(11) The server receives the authentication data encrypted with the random number data from the client. (12) The server then decrypts the authentication data, which has been encrypted with the random number data, using the random number data, and thereby derives the authentication data. (13) The server then calculates a hash value of the authentication data, and (14) transmits the hash value to the client.

The client (15) receives the hash value of the authentication data, and then (16) performs hash-calculation on the authentication data in the same method as that used by the server, so that the client obtains the hash value of the authentication data. (17) The client then compares the hash value of the authentication data received from the server to the hash value of the authentication data, which the client has obtained through calculation. When the hash values match, it is determined that the server has the password. In other words, the client performs the server authentication.

Subsequently, (18) the client performs hash-calculation on the authentication data in a method different from that used for the previous hash-calculation. (19) The client then transmits the hash value of the authentication data to the server.

The server (20) receives the hash value of the authentication data, and then (21) performs hash-calculation on the authentication data in the same method as that used by the client, so that the server obtains the hash value of the authentication data. (22) The server then compares the hash value received from the client to the hash value of the authentication data, which the server has obtained through calculation. When the hash values match, it is determined that the client has the password. In other words, the server performs the client authentication.

Subsequently, (23) the server notifies the client of completion of the authentication. (24) The client receives the notification.

Subsequently, cryptographic communication is performed by using the common key previously generated in the SSL encryption communication (hereinafter, referred to as an SSL common key). Since the server and the client have already authenticated each other, safety is ensured even in the cryptographic communication in which the SSL common key alone is used.

Figure 7:
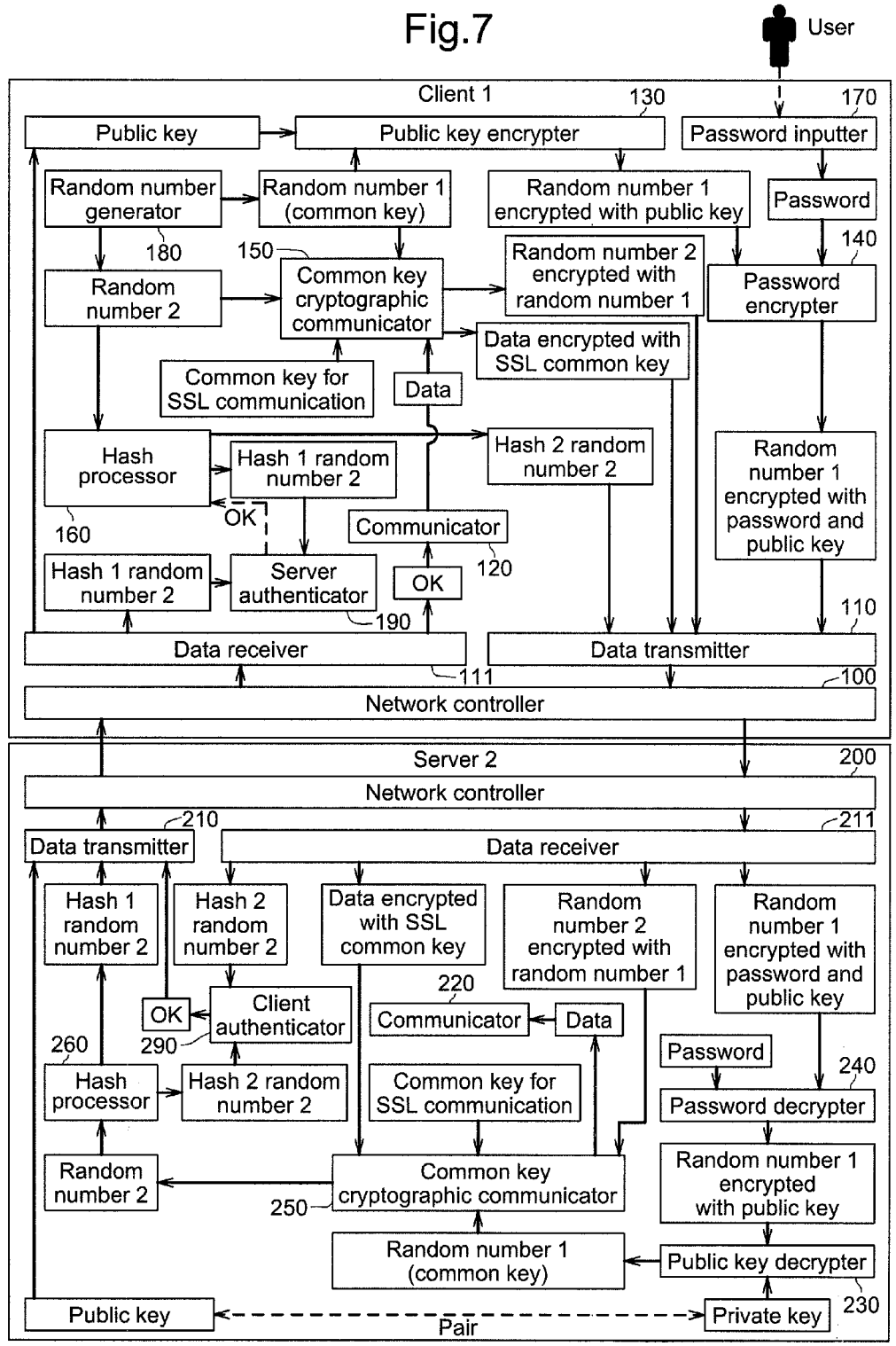
FIG. 7 is a block diagram of FIG. 6.

FIG. 7 is a block diagram of FIG. 6. Accordingly, the processes are the same as those in FIG. 5 up to the process in which the server notifies the client of the result of the client authentication.

Communicator 120 prepares transmission data. Common key cryptographic communicator 150 encrypts the transmission data with the common key for SSL encryption communication, and transmits the encrypted transmission data to server 2 via data transmitter 110.

Common cryptographic communicator 250 receives the transmission data, which has been encrypted with the common key for SSL encryption communication, via data receiver 211. The transmission data encrypted with the common key for SSL encryption communication is decrypted with the SSL common key, and the decrypted data is transmitted to communicator 220.

Communicator 220 interprets the transmission data transmitted from the client. Subsequently, regular SSL encryption communication is performed. Although the client initiates the data transmission herein, the server may initiate the data transmission.

Figure 10:
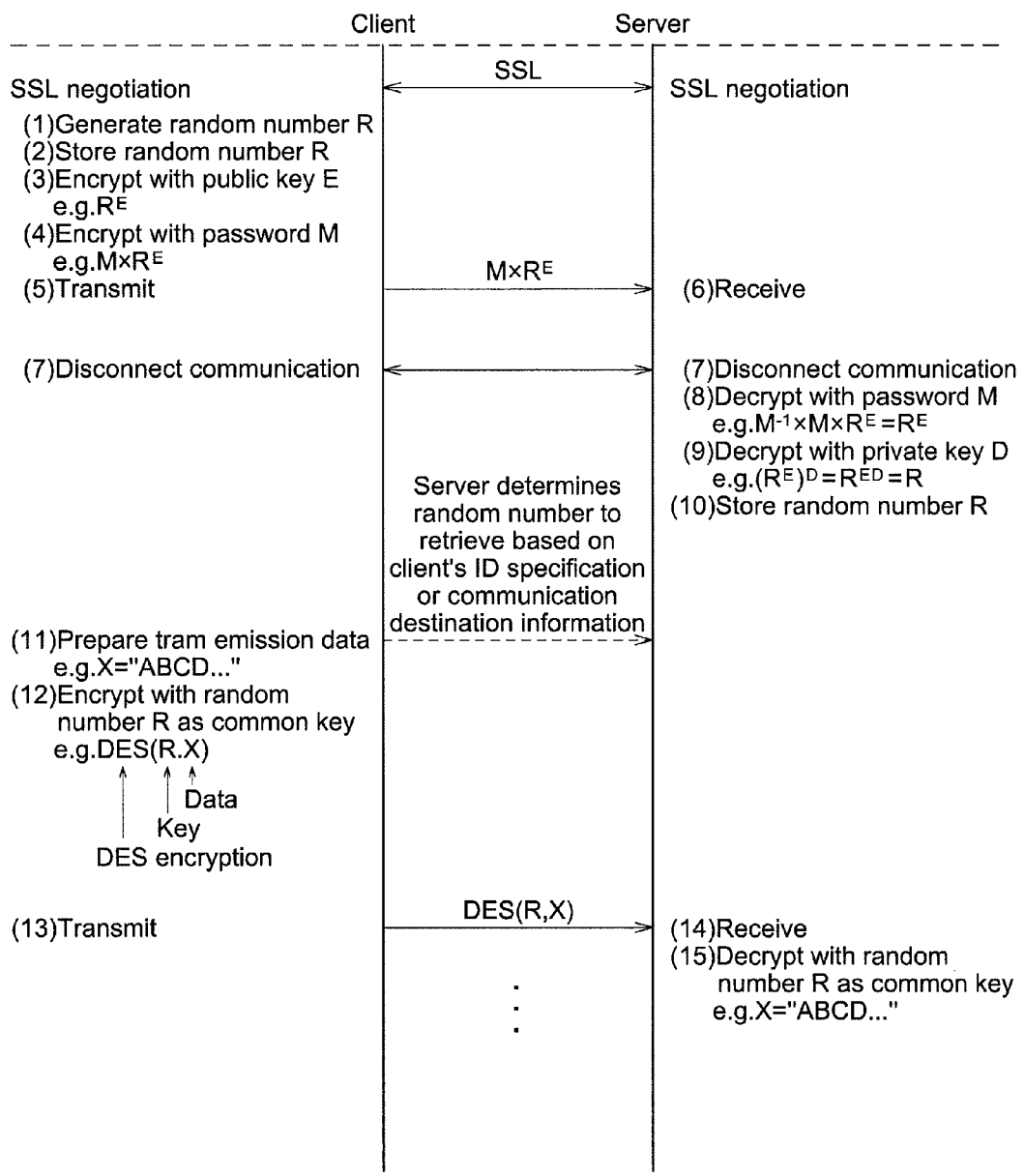
FIG. 10 is a flowchart showing another example of the confidential communication method according to the present invention.

FIG. 10 is a flowchart showing one example of a confidential communication method according to the present invention. In the confidential communication, communication is temporarily disconnected after the random number data is exchanged between the client and the server. The communication is then resumed using the previously exchanged random number data.

The regular SSL negotiation is performed between the client and the server. At this point, the client obtains the SSL public key of the server. However, the public key may be delivered not only in the SSL encryption communication, but also via e-mail or by hand. Any method may be used to deliver the public key.

The client (1) generates random number data, (2) stores the random number data in a non-volatile memory, such as an HDD and the like, and (3) encrypts the random number data with the SSL public key. It is preferable that the random number data have a cryptographically-safe bit length so that off-line attacks are prevented. (4) The random number data encrypted with the SSL public key is further encrypted with the password. As long as the password bit length is not extremely short, this method makes intermediary attacks difficult, and provides safety. However, when the encryption is performed in a different order, intermediary attacks are established. Therefore, the encryption has to be performed in the correct order. Then, (5) the random number data encrypted with the password and the SSL public key is transmitted to the server. Herein, the random number data may be stored in the non-volatile memory in asynchronization with the communication disconnection. The random number data may be stored in the non-volatile memory at latest by the time the client power is turned off. However, when the random number data in the volatile memory is deleted due to the communication disconnection, the random number data has to be stored in the non-volatile memory before the communication is disconnected.

Meanwhile, (6) the server receives the random number data encrypted with the password and the SSL public key from the client. Subsequently, (7) the communication between the client and the server is disconnected. (8) The server then decrypts the random number data, which has been encrypted with the password and the SSL public key, using the password, so that the server derives the random number data encrypted with the SSL public key. How the server identifies the client's password is not described herein. However, for example, similar to regular password authentication, the client may transmit an ID that specifies the password so that the server can identify the client's password. Alternatively, the server may store the password in relation to the client's communication destination information.

Next, (9) the random number data encrypted with the SSL public key is decrypted with the server's SSL private key, so that the random number data is derived. (10) The derived random number data is then stored in the non-volatile memory, such as the HDD and the like. At this point, even when an attacker masquerades as the server, the attacker cannot decrypt the random number data without the password. In addition, since there is no clue except for the encrypted random number data, it is difficult for the attacker to initiate off-line attacks as well. Although the communication is disconnected herein in (7), the communication may be disconnected after (10) instead. Similar to the client's process, the random number data may be stored in the non-volatile memory in asynchronization with the communication disconnection. The random number data may be stored in the non-volatile memory at latest by the time the server power is turned off. However, when the random number data in the volatile memory is deleted due to the communication disconnection, the random number data has to be stored in the non-volatile memory before the communication is disconnected.

The client then resumes the communication. Herein, the method for the server to retrieve the applicable random number data is not particularly limited. For example, the client may respecify the ID to the server, or the server may retrieve the stored random number data out of the client's communication destination information.

As described above, both the client and the server retrieve the random number data out of the non-volatile memories. The client (11) prepares the transmission data, and (12) encrypts the transmission data with the random number data as a common key. (13) The client then transmits the transmission data encrypted with the random number data to the server. The common key may be the random number itself or originate from the random number data.

(14) The server receives the transmission data encrypted with the random number data from the client. (15) The server then decrypts the transmission data, which has been encrypted with the random number data, using the random number data as the common key, and thereby derives the transmission data. Although FIG. 1 shows DES as an example of a common cryptosystem, the AES may also be used. As long as safety is provided, any cryptosystem may be used. Although the client initiates the data transmission herein, the server may initiate the data transmission.

Figure 11:
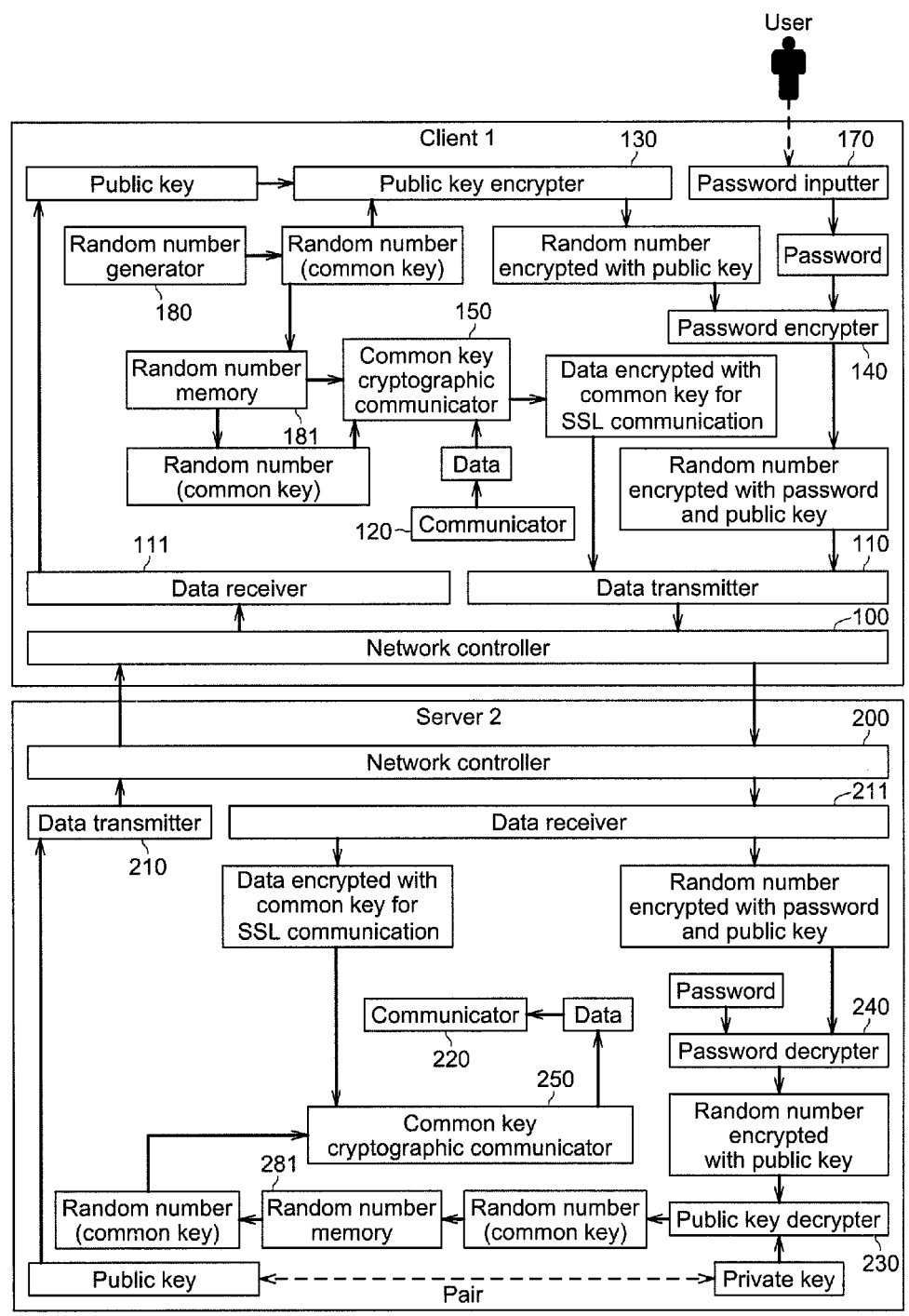
FIG. 11 is a block diagram of FIG. 10.

FIG. 11 is a block diagram of FIG. 10.

First, client 1 connects to server 2, and performs the SSL negotiation. At this point, client 1 obtains the SSL public key of server 2.

A user inputs the password using password inputter 170. In asynchronization with this, random number data generator 180 generates the random number data. The random number data is stored in random number memory 181. Then, public key encrypter 130 encrypts the random number data with the SSL public key. After the user inputs the password, password encrypter 140 further encrypts the random number data, which have been encrypted with the SSL public key, using the password. The random number data encrypted with the SSL public key and the password is transmitted to server 2 via data transmitter 110.

Password decrypter 240 receives the random number data, which has been encrypted with the password and the SSL public key, via data receiver 211. Password decrypter 240 then decrypts the random number data, which has been encrypted with the password and the SSL public key, using the password registered in advance, so that the random number data encrypted with the SSL public key is derived.

Public key decrypter 230 decrypts the random number data, which has been encrypted with the SSL public key, using the SSL private key, so that the random number data is derived. The derived random number data is then stored in random number memory 281. Herein, the SSL private key corresponds to the SSL public key.

At any point after client 1 delivers the random number data encrypted with the password and the SSL public key to server 2, the communication between client 1 and server 2 is temporarily disconnected. Client 1 then resumes the communication. Herein, the method which server 2 uses to retrieve the applicable random number data is not particularly limited. For example, the client may respecify the ID to the server, or the server may retrieve the stored random number data out of the client's communication destination information.

Communicator 120 generates the transmission data. Common key cryptographic communicator 150 encrypts the transmission data with the random number data as the common key, and transmits the transmission data encrypted with the random number data to the server via data transmitter 110.

Common key cryptographic communicator 250 receives the transmission data encrypted with the random number data via data receiver 211. The transmission data encrypted with the random number data is decrypted with the random number data as the common key. Communicator 220 interprets the transmission data. Although client 1 initiates the data transmission herein, server 2 may initiate the data transmission.

Figure 12:
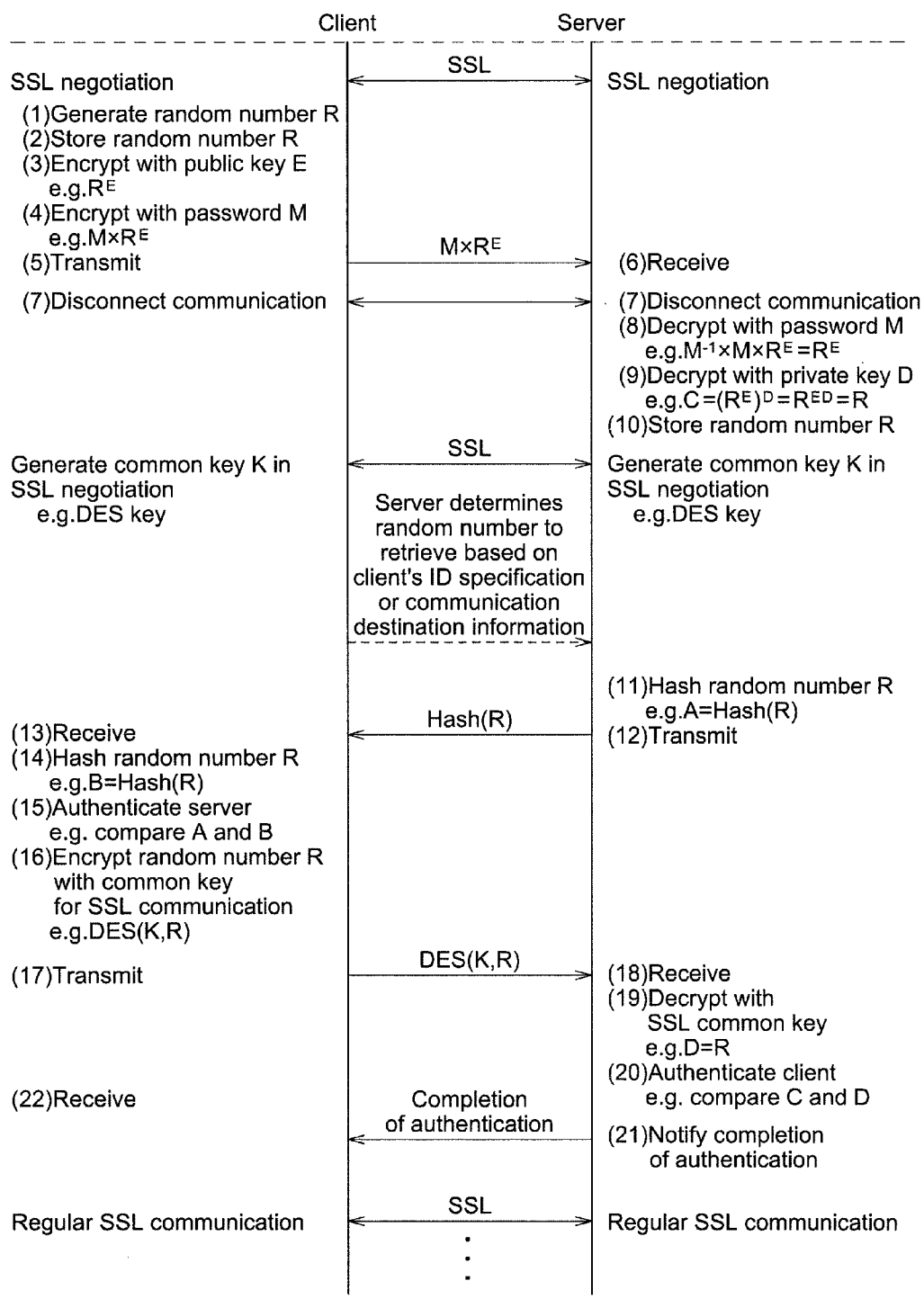
FIG. 12 is a flowchart showing another example of the confidential communication method according to the present invention.

FIG. 12 is a flowchart showing one example of a confidential communication method according to the present invention. The processes are the same as those of the flowchart in FIG. 10 up to (10) in which the random number data is stored. Subsequently, the server authentication and the client authentication are performed using the retrieved random number data, so that the regular SSL encryption communication is performed.

Next, the client performs the SSL negotiation so as to resume communication. At this point, the type of common key cipher system used in the SSL encryption communication is determined. Although DES is used in FIG. 8, the present invention is not limited to this cipher system. Herein, the method for the server to retrieve the applicable random number data is not particularly limited. For example, the client may respecify the ID to the server, or the server may retrieve the stored random number data out of the client's communication destination information. In addition, the random number data may be retrieved before the SSL negotiation.

As described above, both the client and the server retrieve the random number data from the non-volatile memory. The server (11) calculates a hash value of the random number data, and (12) transmits the hash value to the client.

The client (13) receives the hash value of the random number data, and then (14) performs hash-calculation on the random number data in the same method as that used by the server, so that the client obtains the hash value of the random number data. (15) The client then compares the hash value received from the server to the hash value of the random number data, which the client has obtained through calculation. When the hash values match, it is determined that the server has the password. In other words, the client performs the server authentication.

Subsequently, (16) the random number data is encrypted with an SSL common key, and (17) the random number data encrypted with the SSL common key is transmitted to the server.

(18) The server receives the random number data encrypted with the SSL common key. (19) The server then decrypts the random number data, which has been encrypted with the SSL common key, using the SSL common key, and then (20) compares the decrypted random number data to the previously received random number data. When the random number data match, it is determined that the client has the password. In other words, the server performs the client authentication.

After the authentication, (21) the server notifies the client of completion of the authentication. (22) The client receives the notification.

Subsequently, cryptographic communication is performed by using the common key (hereinafter, referred to as an SSL common key) previously generated in the SSL encryption communication.

Figure 13:
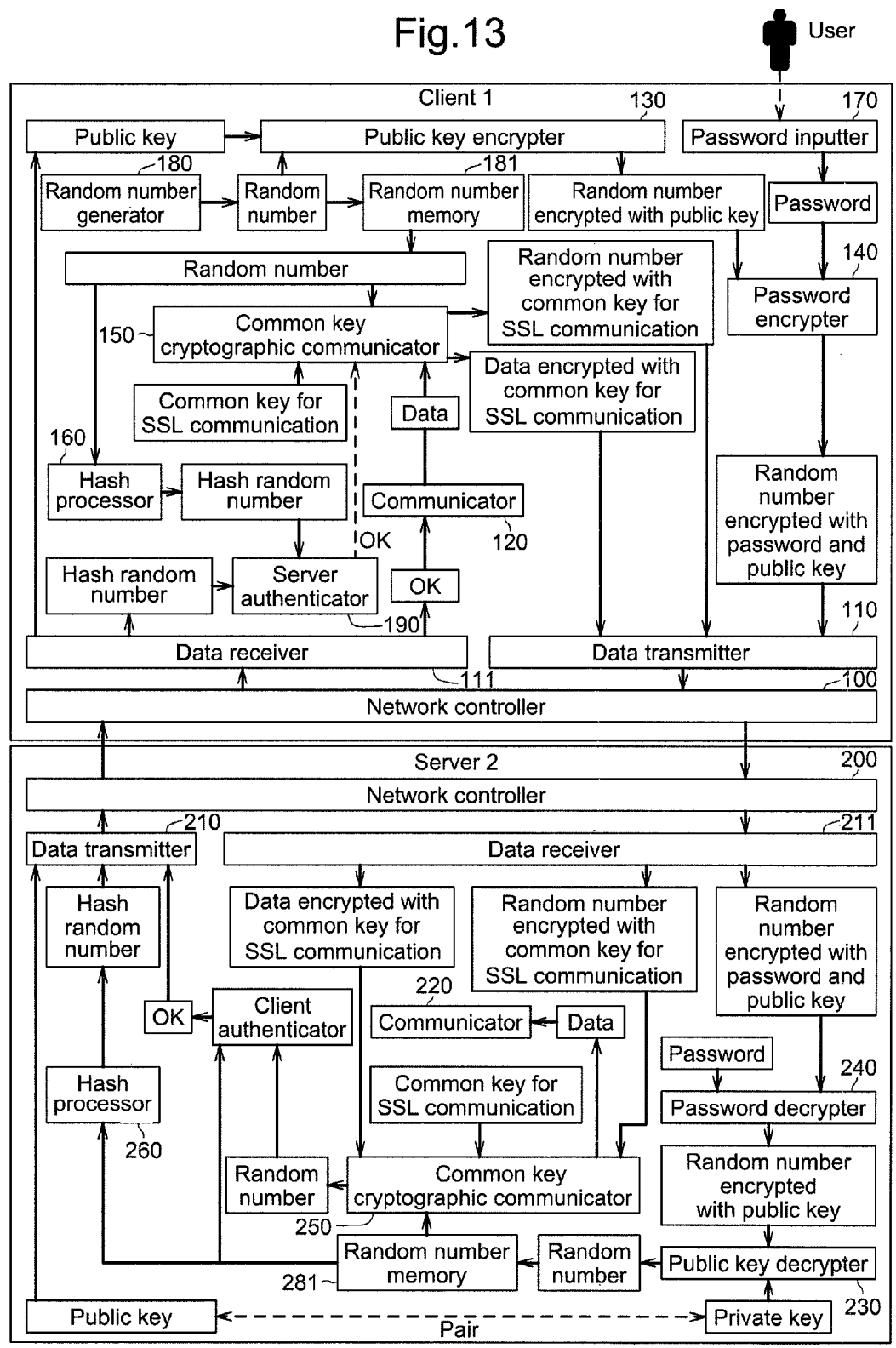
FIG. 13 is a block diagram of FIG. 12.

FIG. 13 is a block diagram of FIG. 12. The processes are the same as those of the block diagram in FIG. 11 up to the process in which the random number data is stored. Subsequently, the server authentication and the client authentication are performed using the retrieved random number data, so that the regular SSL encryption communication is performed.

Next, client 1 performs the SSL negotiation so as to resume communication. Herein, the method for the server to retrieve the applicable random number data is not particularly limited. For example, client 1 may respecify the ID to server 2, or server 2 may retrieve the stored random number data out of the client's communication destination information. In addition, the random number data may be retrieved before the SSL negotiation.

Random number memory 281 retrieves the random number data. Then, hash processor 260 calculates a hash value of the random number data, and transmits the hash value of the random number data to client 1 via data transmitter 210. Even when an attacker obtains the hash value of the random number data at this point, the intermediary cannot derive the random number data since back-calculation is impossible. Therefore, the attacker cannot back-calculate the password, either. Herein, an MD5 or an SHA1 may be used as a hash method. In addition, although the hash value is not encrypted herein, the hash value may be encrypted with the SSL common key for safer communication. In such a case, client 1 has to decrypt the encrypted hash value.

Server authenticator 190 receives the hash value of the random number data via data receiver 111, and compares the received hash value to the hash value of the random number data, which the client has obtained through calculation by hash processor 160. In other words, the client performs the server authentication. When the hash values match, it is determined that the server has the password. When the hash values do not match, it is determined that the server is fake. There is a possibility that the user has entered a wrong password. However, when reentering the password several times still does not lead to a successful result, an intermediary attack is highly likely to be in progress.

When the authentication is finished in server authenticator 190, common key cryptographic communicator 150 encrypts the random number data with the SSL common key, and transmits the transmission data encrypted with the SSL common key to server 2. Herein, since the random number data itself is presented to server 2, the random number data is encrypted with the SSL common key. However, the encryption is not necessary when hash-calculation that is different from that performed for the server authentication is performed on the random number data, so as to make a presentation. In addition, since the server authentication has been finished as of this point, communication safety would not be threatened even when the authentic client transmits the random number data encrypted with the SSL common key to server 2.

Common key cryptographic communicator 250 obtains the random number data, which has been encrypted with the SSL common key, via data receiver 211, and decrypts the random number data with the SSL common key, so that the ransom number data is derived.

Client authenticator 290 compares the previously retrieved random number data to the derived random number data. When the random number data match, it is determined that the client has the password. When the random number data do not match, it is determined that the client is fake.

Client authenticator 290 notifies client 1 of completion of the authentication via data transmitter 210. Communicator 120 receives the authentication completion notification via data receiver 111, so that the client is notified of completion of the client authentication. However, the notification of the authentication completion is not necessarily required.

When the authentication completion notification is given, communicator 120 prepares transmission data. Common key cryptographic communicator 150 encrypts the transmission data with the SSL common key, and transmits the encrypted transmission data to server 2 via data transmitter 110.

Common key cryptographic communicator 250 receives the transmission data, which has been encrypted with the common key for SSL encryption communication, via data receiver 211. The transmission data encrypted with the common key for SSL encryption communication is decrypted with the SSL common key, and the decrypted transmission data is transmitted to communicator 220.

Communicator 220 interprets the transmission data. Subsequently, regular SSL encryption communication is performed. Although the client initiates the data transmission herein, the server may initiate the data transmission.

Figure 14:
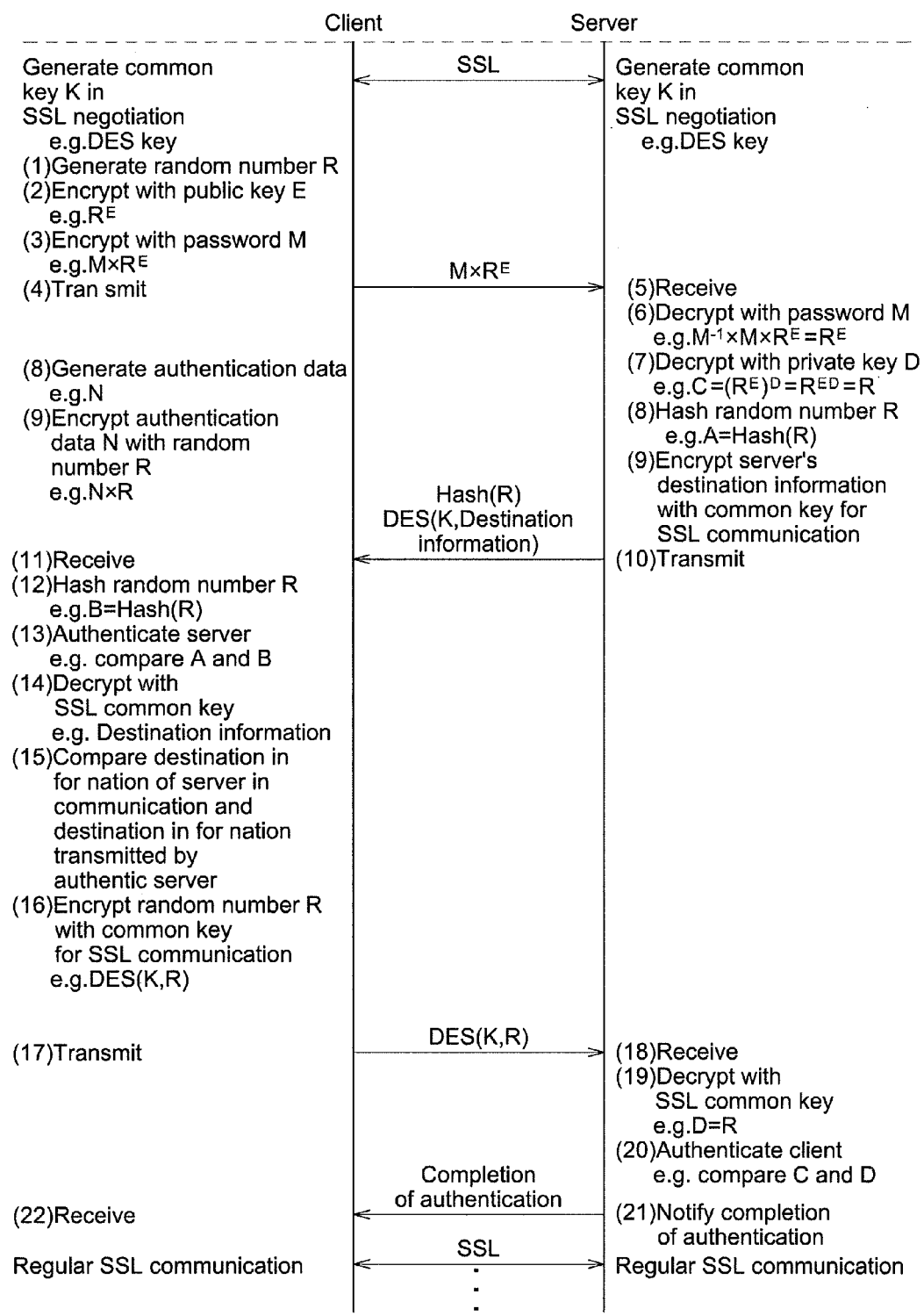
FIG. 14 is a flowchart showing another example of the confidential communication method according to the present invention.

FIG. 14 is a flowchart showing one example of a confidential communication method according to the present invention. In the confidential communication, the client and the server perform mutual authentication to eliminate intermediary attacks. In addition, the server transmits the server's communication destination information to the client, so that communication via an intermediary is also eliminated.

The regular SSL negotiation is performed between the client and the server. At this point, the client obtains the server's SSL public key. In addition, at this point, the type of common key cipher system used in the SSL encryption communication is determined. Although DES is used in FIG. 14, the present invention is not limited to this cipher system.

The client (1) generates random number data, and (2) encrypts the generated random number data with the SSL public key. It is preferable that the random number data have a cryptographically-safe bit length so that off-line attacks are prevented. (3) The random number data encrypted with the SSL public key is further encrypted with a password. As long as the password bit length is not extremely short, this method makes intermediary attacks difficult, and provides safety. However, when the encryption is performed in a different order, intermediary attacks are established. Therefore, the encryption has to be performed in the correct order. Then, (4) the random number data encrypted with the password and the SSL public key is transmitted to the server.

Meanwhile, the server (5) receives the random number data encrypted with the password and the SSL public key from the client. (6) The server then decrypts the random number data, which has been encrypted with the password and the SSL public key, using the password, so that the server derives the random number data encrypted with the SSL public key. How the server identifies the client's password is not described herein. However, for example, similar to regular password authentication, the client may transmit an ID that specifies the password so that the server can identify the client's password. Alternatively, the server may store the password in relation to the client's communication destination information.

Next, (7) the random number data encrypted with the SSL public key is decrypted with the server's SSL private key, so that the random number data is derived. At this point, even when an attacker masquerades as the server, the attacker cannot decrypt the random number data without the password. In addition, since there is no clue except for the encrypted random number data, it is difficult for the attacker to initiate off-line attacks as well.

Subsequently, (8) a hash value of the random number data is calculated, and the server's communication destination information is encrypted with an SSL common key. An IP address and the like may be used as the communication destination information. Herein, it is not desirable that the server's communication destination information, which has been encrypted with the SSL common key, be further encrypted with the random number data. Encrypting such formulaic data with the random number data enables off-line attacks. However, not encrypting the data is not recommended, either. When there is an attacker between the client and the server, the attacker can replace the communication destination information with the attacker's communication destination information. In addition, it is not desirable that such formulaic data be encrypted with the SSL common key, as a clue to the SSL common key might be provided. Therefore, it is preferable that the communication destination information be diffused by new random number data and that the random number data and the communication destination information diffused by the random number data be encrypted with the SSL common key. An advantage of encrypting the communication destination information herein is to prevent data alteration, not to conceal the content.

(10) The hash value of the random number data and the server's communication destination information encrypted with the SSL common key are transmitted to the client.

The client (11) receives the hash value of the random number data and the server's communication destination information, and then (12) performs hash-calculation on the random number data in the same method as that used by the server. The client (13) compares the hash value of the random number data received from the server to the hash value of the random number data, which the client has obtained through calculation. When the hash values match, it is determined that the server has the password. In other words, the client performs the server authentication.

Simultaneously, (14) the server's communication destination information encrypted with the SSL common key is decrypted with the SSL common key. (15) The communication destination information of the server currently in communication with the client is compared to the decrypted communication destination information so as to verify whether the communication is performed without routing through an intermediary. In the above method, simply making regular SSL encryption communication is sufficient to ensure safety when the communication is subsequently disconnected, and then resumed. When there is a long interval between the disconnection and resumption, an attacker might alter the communication destination information of the authentic server during the interval. Therefore, caution is required. When an attacker is environmentally prevented from accessing the authentic server, such as in Internet banking, such caution is rarely required. However, it is not completely safe since DNS cache poisoning attacks have recently emerged.

Subsequently, the client (16) encrypts the random number data with the SSL common key, and (17) transmits the random number data encrypted with the SSL common key to the server.

The server (18) receives the random number data encrypted with the SSL common key. The server (19) decrypts the random number data, which has been encrypted with the SSL common key, using the SSL common key, and (20) compares the decrypted random number data to the random number data obtained previously. When both of the data match, it is determined that the client has the password. In other words, client authentication is performed.

(21) The server notifies the client of completion of the authentication. (22) The client receives the notification. The notification of authentication completion is not necessarily required.

Subsequently, cryptographic communication is performed with the SSL common key. When the client and the server perform mutual authentication, it is desirable, in terms of safety, that the server notify the client of its communication destination information after the authentication.

Figure 15:
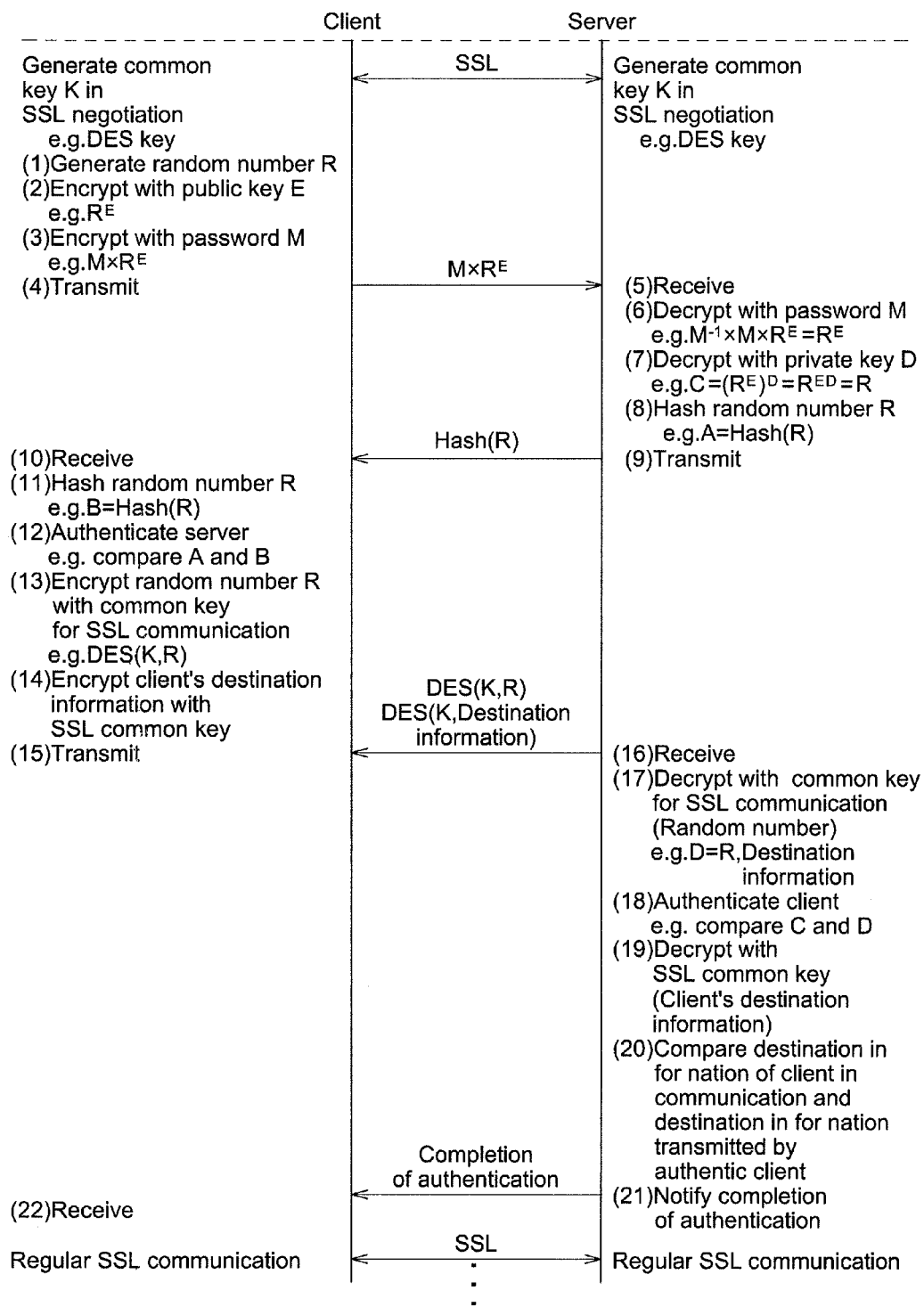
FIG. 15 is a flowchart showing another example of the confidential communication method according to the present invention.

FIG. 15 is a flowchart showing one example of a confidential communication method according to the present invention. Herein, in addition to preventing intermediary attacks by mutual authentication between the client and the server, communication via an intermediary is also prevented by transmitting the client's communication destination information from the client to the server. The difference from the example in FIG. 14 is that the client notifies the server of the client's communication destination information. In terms of safety, it is desirable that the client and the server exchange their communication destination information.

The regular SSL negotiation is performed between the client and the server. At this point, the client obtains the server's SSL public key. In addition, at this point, the type of common key cipher system used in the SSL encryption communication is determined. Although DES is used in FIG. 15, the present invention is not limited to this cipher system.

The client (1) generates random number data, and (2) encrypts the generated random number data with the SSL public key. It is preferable that the random number data have a cryptographically-safe bit length so that off-line attacks are prevented. (3) The random number data encrypted with the SSL public key is further encrypted with the password. As long as the password bit length is not extremely short, this method makes intermediary attacks difficult, and provides safety. However, when the encryption is performed in a different order, intermediary attacks are established. Therefore, the encryption has to be performed in the correct order. Then, (4) the random number data encrypted with the password and the SSL public key is transmitted to the server.

Meanwhile, the server (5) receives the random number data encrypted with the password and the SSL public key from the client. (6) The server then decrypts the random number data, which has been encrypted with the password and the SSL public key, using the password, so that the server derives the random number data encrypted with the SSL public key. How the server identifies the client's password is not described herein. However, for example, similar to regular password authentication, the client may transmit an ID that specifies the password so that the server can identify the client's password. Alternatively, the server may store the password in relation to the client's communication destination information may be used.

Next, (7) the random number data encrypted with the SSL public key is decrypted with the server's SSL private key, so that the random number data is derived. At this point, even when an attacker masquerades as the server, the attacker cannot decrypt the random number data without the password. In addition, since there is no clue except for the encrypted random number data, it is difficult for the attacker to initiate off-line attacks as well.

(8) A hash value of the random number data is calculated, and (9) the hash value is transmitted to the client.

The client (10) receives the hash value of the random number data, and (11) performs hash-calculation on the random number data in the same method as that used by the server. The client (12) compares the hash value of the random number data received from the server to the hash value of the random number data, which the client has obtained through calculation. When the hash values match, it is determined that the server has the password. In other words, the client performs the server authentication.

Subsequently, (13) the random number data is encrypted with an SSL common key, and (14) the client's communication destination information is also encrypted with the SSL common key. An IP address and the like may be used as the communication destination information. Herein, it is not desirable that the client's communication destination information, which has been encrypted with the SSL common key, be further encrypted with the random number data. Encrypting such formulaic data with the random number data enables off-line attacks. However, not encrypting the data is not recommended, either. When there is an attacker between the client and the server, the attacker can replace the communication destination information with the attacker's communication destination information. In addition, it is not desirable that such formulaic data be encrypted with the SSL common key, as a clue to the SSL common key might be provided. Therefore, it is preferable that the communication destination information be diffused by new random number data and that the random number data and the communication destination information diffused by the random number data be encrypted with the SSL common key. An advantage of encrypting the communication destination information herein is to prevent data alteration, not to conceal the content.

The client (15) transmits the random number data encrypted with the SSL common key and the client's communication destination information also encrypted with the SSL common key to the server.

(16) The server receives the random number data encrypted with the SSL common key and the client's communication destination information also encrypted with the SSL common key. The server (17) decrypts the random number data, which has been encrypted with the SSL common key, using the SSL common key, and (18) compares the decrypted random number data to the random number data obtained previously. When the data match, it is determined that the client has the password. In other words, client authentication is performed.

Concurrently with the processing of the random number data, (19) the client's communication destination information encrypted with the SSL common key is decrypted with the SSL common key. (20) The communication destination information of the client currently in communication with the server is compared to the decrypted communication destination information, so as to verify whether communication is performed without routing through an intermediary between the client and the server. In the above method, regular SSL encryption communication is sufficient to ensure safety when the communication is subsequently disconnected, and then resumed. When there is a long interval between the disconnection and resumption, an attacker might alter the communication destination information of the authentic server during the interval. Therefore, caution is required.

(21) The server notifies the client of completion of the authentication. (22) The client receives the notification. The notification of authentication completion is not necessarily required.

Figure 23:
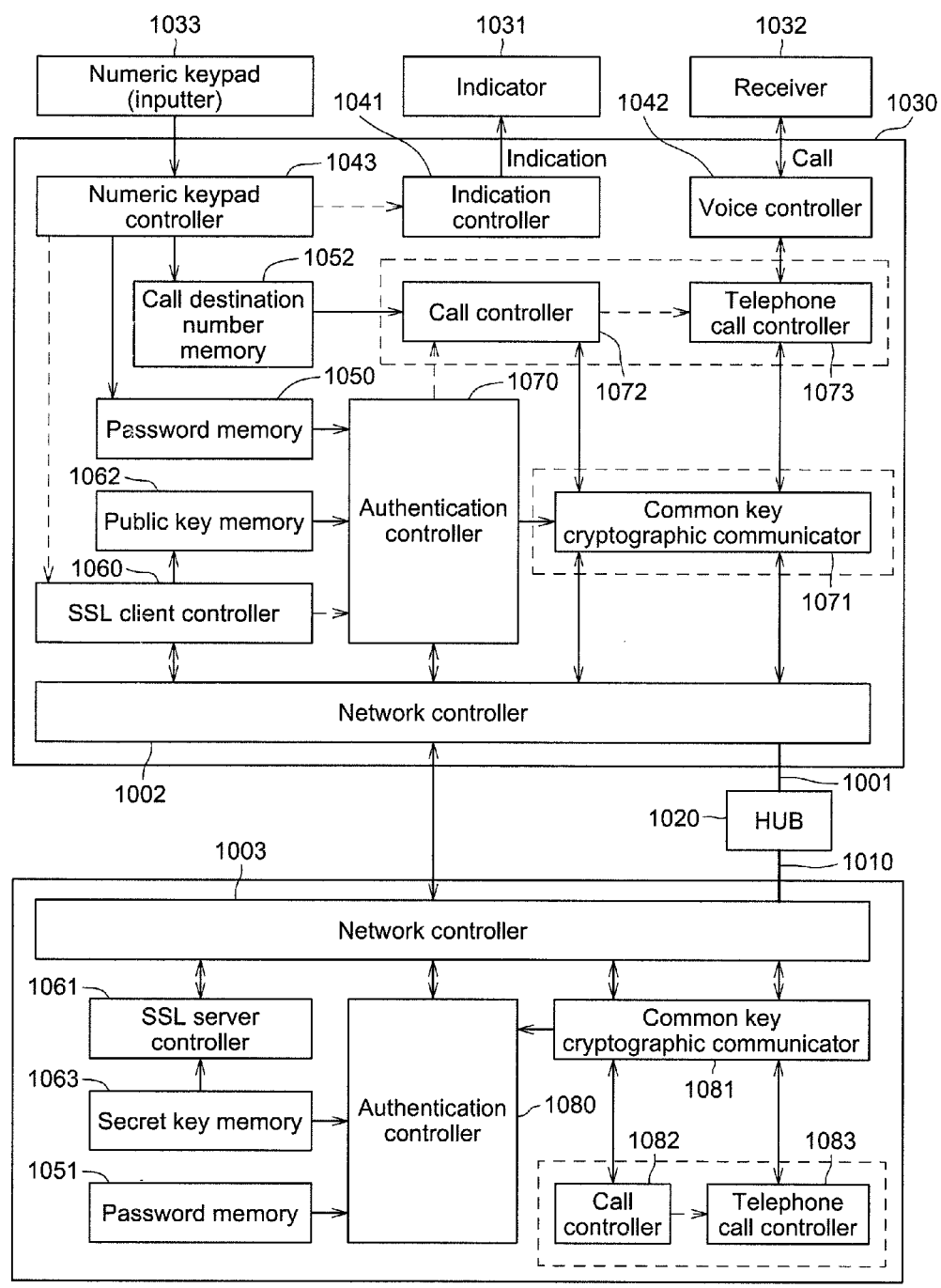
FIG. 23 is a block diagram showing the network PBX of FIG. 23.

Subsequently, cryptographic communication is performed using the common key (hereinafter, referred to as an SSL common key) generated previously in the SSL encryption communication. As described above, the present invention is utilized when the client generates random number data at random, performs two types encryptions (a public key cryptosystem and a password) on the random number data, and then transmits the encrypted random number data to the server. Therefore, communication between the client and the server is performed using the random number data as the common key, or authenticity of the communication destination is verified. What is important herein is that these two types of cryptosystems are used in combination and that the encryptions are performed in a correct order. One of the two cryptosystems alone is not sufficient. Even when the two types of cryptosystems are combined, combining the cryptosystems in a wrong order will enable off-line attacks and online attacks. FIG. 22 is a configuration diagram showing a network PBX (Network Private Branch eXchange) according to an embodiment of the present invention. FIG. 22 shows network cable 1001, network PBX 1010, HUB 1020, PBX terminal (telephone) 1030. Call source terminal (telephone) 1030 and call destination terminal (telephone) 1090 are respectively configured with indicators 1031 and 1091; receivers 1032 and 1092; and numeric keypads (inputters) 1033 and 1093. FIG. 23 is a block diagram showing the network PBX in FIG. 22. Similar to FIG. 22, FIG. 23 shows network cable 1001; network PBX 1010; HUB 1020; and PBX terminal (telephone) 1030. Indicator 1031 in FIG. 23 indicates a screen for prompting a password input and a screen for prompting a call destination number input. Receiver 1032 is used for conversations. Numeric keypad (inputter) 1033 is for a user to input a password and a call destination number. Terminal (telephone) 1030 and network cable PBX 1010 are connected with network cable 1001 via HUB 1020. Network communication is performed between network controller 1002 and network controller 1003, so that data is transmitted and received. In data exchange between terminal (telephone) 1030 and network PBX 1010, network controllers 1002 and 1003 handle transmission and reception of data to and from the network. Descriptions of network controllers 1002 and 1003 are omitted hereinafter for simplicity. Network controllers 1002 and 1003 correspond to network controller 100 and 200 in FIG. 9. As shown in FIG. 22, indication controller 1041 first indicates a screen for prompting a password input on indicator 1031. A user who wants to place a call inputs his or her ID (for example, numbers 0-9, an ID of approximately 8 digits, and "*" at the end) using numeric keypad 1033, and subsequently inputs his or her password (for example, numbers 0-9, an ID of approximately 8 digits, and "#" at the end). Numeric keypad controller 1042 recognizes the numbers input before "*" as an ID and the numbers input before "#" as a password, and stores the ID and the password in password memory 1050. Then, numeric keypad controller 1043 notifies indication controller 1041 of completion of the inputting of the ID and the password. Indicator controller 1031 indicates a screen prompting a call destination number input on indicator 1031. The user who wants to make a call looks at the screen for prompting a call destination number input, and inputs a call destination number using numeric keypad 1033. In detecting the inputting of the call destination number, numeric keypad controller 1043 stores the call destination number in call destination number memory 1052, and notifies SSL client controller 1060 of completion of the inputting of the call destination number. SSL client controller 1060 performs an SSL negotiation with SSL server controller 1061 (SSL client controller 1060 initiates communication). In the SSL negotiation, SSL client controller 1060 stores a public key (public keys E and N in cryptographic communication using an RSA) received from SSL server controller 1061 in public key memory 1062. SSL server controller 1061 performs the SSL negotiation using a private key (private key D and public key N in cryptographic communication using an RSA) read out of secret key memory 1063. Public key E delivered from SSL server controller 1061 to SSL client controller 1060 is also stored in secret key memory 1063. In the SSL negotiation, SSL server controller 1061 reads out public keys E and N from secret key memory 1063, and delivers the keys to SSL client controller 1060. In the final step of the SSL negotiation, each of SSL client controller 1060 and SSL server controller 1061 independently generates a common key used in common key cryptographic communicator 1071 and common key cryptographic communicator 1081. (As is obvious in the SSL specification, the common key is the same between SSL client controller 1060 and SSL server controller 1061.) When the SSL negotiation is completed, SSL client controller 1060 notifies authentication controller 1070 of completion of the SSL negotiation. When the SSL negotiation succeeds, terminal (telephone) 1030 and network PBX 1010 are connected through SSL session (hypothetical cryptographic communication route). However, an intermediary existing between terminal (telephone) 1030 and network PBX 1010 may have performed the SSL negotiation with each of terminal (telephone) 1030 and network PBX 1010, and a bucket bridge attack may be in progress. Therefore, although cryptographic communication has been performed through the SSL session, safety is not ensured. Authentication controller 1070, with authentication controller 1080, performs authentication according to the procedures shown in FIGS. 8 and 9 (except for the descriptions of communicators 120 and 220 and public key communicators 150 and 250 in FIG. 9). Authentication controller 1070 generates data required for a set of authentication using the password read out of password memory 1051, the public key (public keys E and N in an RSA cipher) read out of public key memory 1062, a random number generated within authentication controller 1070, and data received from authentication controller 1080. Authentication controller 1080 generates data required for a set of authentication using the password read out of password memory 1051, the private key (private key D and public keys N in an RSA cipher) read out of private key memory 1063, and data received from authentication controller 1070. At that time, authentication controller 1080 must be able to identify what user password is used in calculation among many passwords stored in password memory 1051. For example, an ID input with a password may be used for identifying the password. Password memory 1051 stores the ID in relation to the password. Authentication controller 1080 identifies the password using the ID added to the data transmitted from authentication controller 1070 to authentication controller 1080. The password may be identified using a telephone number in relation to the password. This method is preferable, as a user does not have to input an ID in terminal (telephone) 1030. The method is suitable when terminal (telephone) 1030 is a cellular phone (unshared telephone) owned by each user. In receiving a notification of client authentication completion from authentication controller 1080, authentication controller 1070 notifies call controller 1072 that corresponds to communicator 120 in FIG. 9 of completion of the authentication. When server authentication has failed in authentication controller 1070 and when the client authentication has failed in authentication controller 1080, the SSL session currently connected is disconnected as of the time of the failure. When the server authentication in authentication controller 1070 and the client authentication in authentication controller 1080 are successful, according to the principle described the sixth aspect of the present invention, terminal (telephone) 1030 has the public key of network PBX 1010, not an intermediary's a public key. Therefore, safe communication can be performed. Even when an intermediary exists between terminal (telephone) 1030 and network PBX 1010, the intermediary cannot crack the transmitted and received data as long as the SSL session (cryptographic communication) is performed. Call controller 1072 reads a call destination number out of call destination number memory 1052, and controls a call with call controller 1082, which corresponds to communicator 220 in FIG. 9, according to, for example, an SIP (Session Initiation Protocol). However, all data transmitted and received in this call control are encrypted and decrypted via common key cryptographic communicator 1071 that corresponds to common key cryptographic communicator 150 in FIG. 9 and common key cryptographic communicator 1081 that corresponds to common key cryptographic communicator 250 in FIG. 9. In other words, communication is performed in a safe manner through the SSL session (cryptographic communication). When the call control is completed between call controller 1072 and call controller 1082, call controller 1072 notifies telephone call controller 1073 that also corresponds to communicator 120 in FIG. 9 of the completion. Similarly, when the call control is completed between call controller 1072 and call controller 1082, call controller 1082 notifies telephone call controller 1083 that also corresponds to communicator 220 in FIG. 9 of the completion. Voice data is transmitted and received between telephone call controller 1073 and telephone call controller 1083. Similar to the call control, all transmitted and received data are encrypted and decrypted via common key cryptographic communicator 1071 and common key cryptographic communicator 1081. In other words, communication is performed in a safe manner through the SSL session (cryptographic communication). In receiving the voice data, telephone call controller 1073 plays the voice in receiver 1032 via voice controller 1042. On the contrary, when the voice is played from receiver 1032, telephone call controller 1072 receives the voice as voice data via voice controller 1042, and transmits the voice data to telephone call controller 1083. Although the drawing does not show how a connection is made between telephone 1090 (a call destination) and network PBX 1010 following the above step, the connection between telephone 1090 (a call destination) and network PBX 1010 is basically made in the same manner where the connection between terminal (telephone) 1030 and network PBX 1010 is made. However, there are two differences. The first difference is that network PBX 1010 transmits a sign of communication initiation to a call destination telephone. In receiving the sign, a bell of the call destination telephone rings, and, similar to terminal (telephone) 1030, indicator 1091 shows a screen for prompting a password input. The transmission and reception of the sign is not the SSL negotiation. The second difference is that, when a user inputs his or her ID and a password at call destination telephone 1090, the SSL negotiation immediately starts. Of course, since a call destination number is not necessary between call destination telephone 1090 and network PBX 1010, the user does not have to input the call destination number at call destination telephone 1090. As described above, as of completion of a set of the SSL negotiation, authentication, call control, and telephone call control between terminal (telephone) 1030 and network PBX 1010, and call destination telephone 1090 and network PBX 1010, a telephone call is established between terminal (telephone) 1030 and call destination telephone 1090. The telephone call control may also be performed after the telephone call is established between terminal (telephone) 1030 and call destination telephone 1090. Distribution of a client certificate to terminal (telephone) 1030 is known as a method to prevent intermediary attacks (to ensure safe communication) in conventional network PBX 1010. However, it is expensive for practical use, and requires cumbersome management of validity terms and the like. However, the above-described method is not costly for practical use, easily managed, and does not reduce safety. In addition, when terminal (telephone) 1030 is a cellular phone owned by each user, unauthorized use of the cellular phone can be prevented when the cellular phone is lost. (A correct password has to be input at the time of use. In addition, the password is not stored in the cellular phone. Therefore, even when the cellular phone is analyzed, safety is ensured.)

The confidential communication method according to the present invention eliminates intermediaries and ensures safety in asymmetric public key cryptographic communication, such as the SSL encryption communication, in a simple manner and under a light load while using a cryptographically-vulnerable password having a short bit length. The present invention can be easily implemented in systems having the SSL feature, and therefore is useful.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A confidential communication method in a public key cipher system where a client and a server share a password, wherein
  the client, embodied as a processor, comprises:
  a public key cipher system encrypter performing encryption with a public key in the public key cipher system;
  a client data transmitter/receiver that transmits data to and receives data from a network;
  a password encrypter performing encryption with the password; and
  a random number data generator generating random number data, or obtaining random number data from an apparatus other than the client: and
  the server, embodied as a processor, comprises:
  a server data transmitter/receiver that transmits data to and receives data from a network;
  a public key cipher system decrypter decrypting data encrypted by the public key cipher system encrypter; and
  a password decrypter decrypting data encrypted by the password encrypter,
  the method comprising:
  generating or obtaining, by the client, the random number data using the random number data generator,
  encrypting, by the client, the random number data using the public key cipher system encrypter,
  further encrypting, by the client, the random number data, which has been encrypted by the public key cipher system encrypter, using the password encrypter, and
  decrypting, by the server, the random number data, which has been encrypted by the public key cipher system encrypter and the password encrypter, using the public key cipher system decrypter and the password decrypter, wherein both the client and the server comprise a common key encrypter/decrypter performing encryption and decryption with the common key, wherein both the client and the server comprise a back-calculation-difficult calculator that makes back-calculation difficult, the back-calculation difficult calculator processing random authentication data by presenting a remainder resulting from calculation in which the random number data is a divisor and the random authentication data is a dividend when determining whether the client or the server has the password, the method further comprising:

performing cryptographic communication over the network between the client data transmitter/receiver of the client and the server data transmitter/receiver of the server by using one of the common key generated from at least a portion of the random number data and the common key generated from at least a portion of the random number data as an original key, in the common key encrypter/decrypter, masking, by the server, the decrypted random number data with a specific bit pattern, masking, by the client, the generated or obtained random number data with the specific bit pattern, comparing, by the client, the masked random number data, which is masked by the client, to the decrypted random number data, which is masked by the server, and determining, by the client, whether or not the server has the password based on the comparison result.

2. The confidential communication method according to claim 1, further comprising:

verifying, by the client, whether the server has the password before the client provides the server with one of: the random number data itself, data different from the random number data encrypted by the public key cipher system encrypter and the password encrypter and giving a clue as to the random number data, the password itself, and data giving a clue as to the password.

3. The confidential communication method according to claim 2, further comprising:

preparing, by the client, random authentication data, encrypting, by the client, the authentication data using the common key encrypter/decrypter, and transmitting, by the client, using the client data transmitter/receiver the encrypted authentication data to the server; and decrypting, by the server, the received authentication data using the common key encrypter/decrypter, the method further comprising:

processing, by the server, at least a portion of the authentication data using the back-calculation-difficult calculator, presenting, by the server, the processed authentication data to the client; and processing, by the client, the authentication data using the back-calculation-difficult calculator, and comparing, by the client, the processed authentication data by the client to the processed authentication data received from the server so as to determine whether the server has the password, based on whether both processed authentication data match.

4. The confidential communication method according to claim 2, wherein, after the client verifies whether the server has the password, the server verifies whether the client has the password.

5. The confidential communication method according to claim 4, wherein both the client and the server comprise a second common key encrypter/decrypter performing encryption and decryption with the common key wherein cryptographic communication is performed between the client and the server by using one of: the common key generated from at least a portion of exchanged data different from the random number data; and the common key generated from at least a portion of the exchanged data as an original key, in the second common key encrypter/decrypter, the common keys being exchanged by using one of: the public key cipher system encrypter and the public key cipher system decrypter; the password encrypter and the password decrypter; the common key encrypter/decrypter; and the cryptographic communication using the password performed from the server to the client.

6. The confidential communication method according to claim 2, wherein the method further comprising:

processing, by the server, one of the random number data and at least a portion of random number data newly exchanged in a method similar to that used to exchange the random number data, using the back-calculation-difficult calculator, presenting, by the server, the processed random number data to the client, processing, by the client, the random number data using the back-calculation-difficult calculator, and comparing, by the client, the processed random number data to the processed random number data received from the server so as to determine whether the server has the password, based on whether both random number data match.

7. The confidential communication method according to claim 4, wherein, when the server verifies whether the client has the password, the client notifies the server of its communication destination information using the cryptographic communication; and the server then verifies whether there is an intermediary between the client and the server, based on communication destination information of the client in communication with the server and the received communication destination information.

8. The confidential communication method according to claim 2, wherein, when the client verifies whether the server has the password, the server notifies the client of its communication destination information using the cryptographic communication; and the client then verifies whether there is an intermediary between the client and the server, based on the communication destination information of the server in communication with the client and the received communication destination information.

9. The confidential communication method according to claim 1, wherein both the client and the server comprise a random number data memory storing the random number data in a memory device and retrieving the stored random number data out of the memory device, wherein both the client and the server store the random number data in the memory device using the random number data memory after obtaining the random number data, and retrieve the random number data out of the memory device using the random number data memory the next time a connection is made between the client and the server.

10. The confidential communication method according to claim 1, wherein the client further comprises a password inputter configured to receive the password, and the method further comprises receiving the password by the password inputter of the client.

11. A confidential communication method in a public key cipher system where a client and a server share a password, wherein the client, embodied as a processor, comprises:
- a public key cipher system encrypter performing encryption with a public key in the public key cipher system;
- a client data transmitter/receiver that transmits data to and receives data from a network;
- a password encrypter performing encryption with the password; and
- a random number data generator generating random number data, or obtaining random number data from another apparatus; and the server, embodied as a processor, comprises:
- a server data transmitter/receiver that transmits data to and receives data from a network;
- a public key cipher system decrypter decrypting data encrypted by the public key cipher system encrypter; and
- a password decrypter decrypting data encrypted by the password encrypter, wherein both the client and the server comprise a back-calculation-difficult calculator that makes back-calculation difficult, the back-calculation difficult calculator processing random authentication data by presenting a remainder resulting from calculation in which the random number data is a divisor and the random authentication data is a dividend when determining whether the client or the server has the password, the method comprising:
- generating or obtaining, by the client, the random number data using the random number data generator,
- encrypting, by the client, the random number data using the public key cipher system encrypter,
- further encrypting, by the client, the random number data, which has been encrypted by the public key cipher system encrypter, using the password encrypter,
- decrypting, by the server, the random number data, which has been encrypted by the public key cipher system encrypter and the password encrypter, using the public key cipher system decrypter and the password decrypter,
- confidentially revealing, by the server, to the client, that the server has obtained the random number data without informing a third party, so that the client verifies that the server has the password,
- masking, by the server, the decrypted random number data with a specific bit pattern, masking, by the client, the generated or obtained random number data with the specific bit pattern,
- comparing, by the client, the masked random number data, which is masked by the client, to the decrypted random number data, which is masked by the server, and
- determining, by the client, whether or not the server has the password based on the comparison result.

12. The confidential communication method according to claim 11, wherein the client further comprises a password inputter configured to receive the password, and the method further comprises receiving the password by the password inputter of the client.

* * * * *